United States Patent
Islam et al.

(10) Patent No.: US 12,192,899 B2
(45) Date of Patent: Jan. 7, 2025

(54) TRANSMISSION OF WAKEUP SIGNAL THROUGH MILLIMETER WAVE AND SUB-6 GHz BANDS

(71) Applicant: QUALCOMM Incorporated, San Diego, CA (US)

(72) Inventors: Muhammad Nazmul Islam, Edison, NJ (US); Juergen Cezanne, Ocean Township, NJ (US); Ashwin Sampath, Skillman, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 16/104,014

(22) Filed: Aug. 16, 2018

(65) Prior Publication Data

US 2019/0059056 A1    Feb. 21, 2019

Related U.S. Application Data

(60) Provisional application No. 62/547,616, filed on Aug. 18, 2017.

(51) Int. Cl.
*H04L 27/26* (2006.01)
*H04B 7/06* (2006.01)
(Continued)

(52) U.S. Cl.
CPC ...... *H04W 52/0229* (2013.01); *H04B 7/0695* (2013.01); *H04L 1/00* (2013.01);
(Continued)

(58) Field of Classification Search
None
See application file for complete search history.

(56) References Cited

U.S. PATENT DOCUMENTS

| 2004/0127265 A1 | 7/2004 | Van Bosch et al. |
| 2013/0072256 A1* | 3/2013 | Su ............ H04W 52/0274 |
| | | 455/558 |

(Continued)

FOREIGN PATENT DOCUMENTS

| CN | 105191432 A | 12/2015 |
| WO | WO-2014071396 A1 | 5/2014 |
| WO | WO-2016089294 A1 | 6/2016 |

OTHER PUBLICATIONS

International Search Report and Written Opinion—PCT/US2018/046901—ISA/EPO—Dec. 12, 2018 (175790WO).

(Continued)

*Primary Examiner* — Gregory B Sefcheck
*Assistant Examiner* — Suk Jin Kang
(74) *Attorney, Agent, or Firm* — Holland & Hart LLP

(57) ABSTRACT

Methods, systems, and devices for wireless communication are described. A base station may identify that data is available to be transmitted to a user equipment (UE) that is operating in a discontinuous reception (DRX) mode. The base station may transmit, based at least in part on the data being available, a first wakeup message using a first band supported by the UE. The base station may transmit, based at least in part on the data being available, a second wakeup message using a second band supported by the UE, the second band being different from the first band.

26 Claims, 16 Drawing Sheets

(51) Int. Cl.

| | | |
|---|---|---|
| *H04L 1/00* | (2006.01) | |
| *H04L 5/00* | (2006.01) | |
| *H04L 5/14* | (2006.01) | |
| *H04W 52/02* | (2009.01) | |
| *H04W 68/00* | (2009.01) | |
| *H04W 72/044* | (2023.01) | |
| *H04W 76/28* | (2018.01) | |

(52) U.S. Cl.
CPC ............ *H04L 5/001* (2013.01); *H04L 5/0048* (2013.01); *H04L 5/008* (2013.01); *H04L 5/0092* (2013.01); *H04L 27/26* (2013.01); *H04W 52/0216* (2013.01); *H04W 68/005* (2013.01); *H04W 76/28* (2018.02); *H04L 5/0023* (2013.01); *H04L 5/0035* (2013.01); *H04L 5/0055* (2013.01); *H04L 5/14* (2013.01); *H04W 72/046* (2013.01)

(56) References Cited

U.S. PATENT DOCUMENTS

| | | | | |
|---|---|---|---|---|
| 2014/0128109 | A1* | 5/2014 | Li | H04W 68/02 455/458 |
| 2014/0198696 | A1* | 7/2014 | Li | H04W 52/0229 370/311 |
| 2015/0208349 | A1* | 7/2015 | Ramamurthy | H04W 52/028 370/311 |
| 2017/0041873 | A1* | 2/2017 | Wu | H04W 60/00 |
| 2017/0055217 | A1* | 2/2017 | Sen | H04W 52/0229 |
| 2018/0184377 | A1* | 6/2018 | Kenney | H04W 4/80 |
| 2018/0184435 | A1* | 6/2018 | Cariou | H04W 52/0203 |
| 2018/0302854 | A1* | 10/2018 | Ramamurthy | H04W 52/028 |
| 2018/0376419 | A1* | 12/2018 | Li | H04W 52/0222 |
| 2019/0028967 | A1* | 1/2019 | Ahn | H04B 7/02 |
| 2019/0045481 | A1* | 2/2019 | Sang | H04W 76/14 |
| 2019/0159127 | A1* | 5/2019 | Son | H04W 52/0219 |
| 2019/0239189 | A1* | 8/2019 | Hwang | H04W 52/0229 |
| 2019/0253973 | A1* | 8/2019 | Li | H04W 52/0219 |
| 2019/0281580 | A1* | 9/2019 | Rune | H04W 76/28 |
| 2019/0319771 | A1* | 10/2019 | Huang | H04W 52/0222 |
| 2019/0364492 | A1* | 11/2019 | Azizi | H04W 68/005 |
| 2020/0015166 | A1* | 1/2020 | Ahn | H04W 52/02 |
| 2020/0022081 | A1* | 1/2020 | Ljung | H04L 1/0004 |
| 2020/0022082 | A1* | 1/2020 | Ljung | H04W 72/042 |
| 2020/0029302 | A1* | 1/2020 | Cox | H04W 68/02 |
| 2020/0045635 | A1* | 2/2020 | Lin | H04W 52/0248 |
| 2020/0059863 | A1* | 2/2020 | Ji | H04W 52/0229 |
| 2020/0077338 | A1* | 3/2020 | Sui | H04W 52/0229 |
| 2020/0084749 | A1* | 3/2020 | Sang | H04W 76/12 |
| 2020/0092808 | A1* | 3/2020 | Beale | H04W 52/0235 |
| 2020/0120634 | A1* | 4/2020 | Lee | H04W 24/10 |
| 2020/0137685 | A1* | 4/2020 | Kim | H04W 52/0241 |
| 2020/0145921 | A1* | 5/2020 | Zhang | H04W 52/0235 |
| 2020/0163017 | A1* | 5/2020 | Priyanto | H04W 88/04 |
| 2020/0163048 | A1* | 5/2020 | Kim | H04L 1/0061 |
| 2020/0169954 | A1* | 5/2020 | Namba | H04W 52/327 |
| 2020/0169956 | A1* | 5/2020 | Sun | H04W 52/0229 |
| 2020/0178171 | A1* | 6/2020 | Lou | H04W 52/0225 |
| 2020/0178177 | A1* | 6/2020 | Kim | H04W 80/02 |
| 2020/0205076 | A1* | 6/2020 | Chen | H04W 52/02 |
| 2021/0289582 | A1* | 9/2021 | Bergstrom | H04L 1/1829 |
| 2022/0007288 | A1* | 1/2022 | Ji | H04W 84/12 |

OTHER PUBLICATIONS

Mediatek Inc: "Paging in NR with Beam Sweeping", 3GPP Draft; R2-1701331 Paging IN NR with Beam Sweeping, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 3, 2017 (Feb. 3, 2017), pp. 1-4, XP051222867, Retrieved from the Internet: URL: http://www.3gpp.org/ftp/tsg_ran/WG2_RL2/TSGR2_97/Docs/ [retrieved on Feb. 3, 2017].

Qualcomm Incorporated: "Beam Management and C-DRX Operation", 3GPP Draft; R2-1706911 Beam Management and DRX, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 29, 2017 Jun. 26, 2017, XP051301408, Retrieved from the Internet: URL:http://www.3gpp.org/ftp/Meetings_3GPP_SYNC/RAN2/ [retrieved on Jun. 26, 2017], 3 pages.

Qualcomm Incorporated: "Consideration on NR Paging", 3GPP Draft; R2-1706882_NR Paging Design, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017 Jun. 26, 2017, XP051301379, Retrieved from the Internet: URL:http://www.3gpp.org/ftp/Meetings_3GPP_SYNC/RAN2/Docs/ [retrieved on Jun. 26, 2017], 6 pages.

Qualcomm Incorporated: "Wake-Up Schemes for DRX in NR", 3GPP Draft; R2-1706524 Wake-Up Schemes for DRX, 3rd Generation Partnership Project (3GPP), Mobile Competence Centre; 650, Route Des Lucioles; F-06921 Sophia-Antipolis Cedex; France, vol. RAN WG2, No. Qingdao. China; Jun. 27, 2017-Jun. 29, 2017 Jun. 17, 2017, XP051307043, Retrieved from the Internet: URL:http://www.3gpp.org/ftp/tsg_ran/WG2_RL2/TSGR2_AHs/2017_06_NR/Docs/ [retrieved on Jun. 17, 2017], 4 pages.

* cited by examiner

TRANSMISSION OF WAKEUP SIGNAL THROUGH MILLIMETER WAVE AND SUB-6 GHz BANDS

CROSS REFERENCES

The present Application for Patent claims the benefit of U.S. Provisional Patent Application No. 62/547,616 by ISLAM et al., entitled "TRANSMISSION OF WAKEUP SIGNAL THROUGH MILLIMATER WAVE AND SUB-6 GHZ BANDS," filed Aug. 18, 2017, assigned to the assignee hereof, and expressly incorporated by reference herein.

BACKGROUND

The following relates generally to wireless communication, and more specifically to transmission of a wakeup signal through millimeter wave (mmW) and sub-6 GHz bands.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an On Duration (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH), a channel state information reference signal (CSI-RS), and the like. The PDCCH may carry or otherwise convey an indication that the base station has data ready to transmit to the UE. In a mmW wireless communication system, the mmW base station (e.g., a next generation nodeB (gNB)) may beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support transmission of a wakeup signal through millimeter wave (mmW) and sub-6 GHz bands. Generally, the described techniques provide for a base station to transmit wakeup signals on a first band (e.g., a mmW band or radio access technology (RAT)) and a second band (e.g., a sub-6 GHz band/RAT). In one example, the base station may transmit the wakeup signals on the first and second bands at the same time and then wait for a response from the user equipment (UE) on either band. In another example, the base station may transmit the wakeup signal on the first band and wait to see if the UE responds on the first band. If no response is received, the base station may then transmit the wakeup signal on the second band. In yet another example, the base station may transmit the wakeup signal on the second band with an indication that the wakeup signal will be/is transmitted on the first band. Accordingly, the base station may convey an indication that data is available to transmit to the UE by transmitting the wakeup signals on the two bands. In some examples, the base station may refer to two or more base stations (e.g., a micro base station and a macro base station cooperating with the micro base station) where the first base station transmits the first wakeup signal on the first band and the second base station transmits the second wakeup signal on the second band. The second base station may transmit an indication to the first base station if it receives a response from the UE on the second band, and vice versa.

In some aspects, the UE may monitor for wakeup signals on the first and/or second bands. For example, the UE may identify that it supports communicating on the first and second bands. Accordingly, the UE may receive the second wakeup signal on the second band and respond with a signal (e.g., a beam recovery signal) on the first band.

A method of wireless communication is described. The method may include identifying that data is available to be transmitted to a UE that is operating in a discontinuous reception (DRX) mode, transmitting, based at least in part on the data being available, a first wakeup message using a first band supported by the UE, and transmitting, based at least in part on the data being available, a second wakeup message using a second band supported by the UE, the second band being different from the first band.

An apparatus for wireless communication is described. The apparatus may include means for identifying that data is available to be transmitted to a UE that is operating in a DRX mode, means for transmitting, based at least in part on the data being available, a first wakeup message using a first band supported by the UE, and means for transmitting, based at least in part on the data being available, a second wakeup message using a second band supported by the UE, the second band being different from the first band.

Another apparatus for wireless communication is described. The apparatus may include a processor, memory in electronic communication with the processor, and instructions stored in the memory. The instructions may be operable to cause the processor to identify that data is available to be transmitted to a UE that is operating in a DRX mode, transmit, based at least in part on the data being available, a first wakeup message using a first band supported by the UE, and transmit, based at least in part on the data being available, a second wakeup message using a second band supported by the UE, the second band being different from the first band.

A non-transitory computer readable medium for wireless communication is described. The non-transitory computer-readable medium may include instructions operable to cause a processor to identify that data is available to be transmitted to a UE that is operating in a DRX mode, transmit, based at least in part on the data being available, a first wakeup message using a first band supported by the UE, and transmit, based at least in part on the data being available, a second wakeup message using a second band supported by the UE, the second band being different from the first band.

Some examples of the method, apparatus, and non-transitory computer-readable medium described above may further include processes, features, means, or instructions for receiving a signal on the first band, the signal indicating a beam index associated with a transmit beam of the base station.

Some examples of the method, apparatus, and non-transitory computer-readable medium described above may further include processes, features, means, or instructions for transmitting the available data to the UE using the first band and according to the beam index received in the signal.

In some examples of the method, apparatus, and non-transitory computer-readable medium described above, the signal comprises a beam recovery signal.

Some examples of the method, apparatus, and non-transitory computer-readable medium described above may further include processes, features, means, or instructions for determining that a response message was not received on the first band. Some examples of the method, apparatus, and non-transitory computer-readable medium described above may further include processes, features, means, or instructions for transmitting the second wakeup message using the second band based at least in part on the determination.

In some examples of the method, apparatus, and non-transitory computer-readable medium described above, the first wakeup message and the second wakeup message may be sent at substantially the same time.

Some examples of the method, apparatus, and non-transitory computer-readable medium described above may further include processes, features, means, or instructions for receiving a response message from the UE using the second band, the response message indicating that the UE received the second wakeup message using the second band but did not receive the first wakeup message using the first band. Some examples of the method, apparatus, and non-transitory computer-readable medium described above may further include processes, features, means, or instructions for transmitting a set of reference signals using the first band and according to a beam sweeping configuration.

Some examples of the method, apparatus, and non-transitory computer-readable medium described above may further include processes, features, means, or instructions for receiving a beam recovery signal in response to the set of reference signals, the beam recovery signal comprising a beam index associated with a transmit beam from the set of reference signals. Some examples of the method, apparatus, and non-transitory computer-readable medium described above may further include processes, features, means, or instructions for transmitting the available data to the UE using the first band and according to the beam index received in the beam recovery signal. In some examples of the method, apparatus, and non-transitory computer-readable medium described above, the set of reference signals comprise a channel state information reference signal (CSI-RS), a demodulation reference signal (DMRS), a tracking reference signal (TRS), a beam reference signal, a synchronization signal, or combinations thereof. In some examples of the method, apparatus, and non-transitory computer-readable medium described above, the synchronization signal comprises a primary synchronization signal (PSS), a secondary synchronization signal (SSS), a physical broadcast channel (PBCH) signal, or combinations thereof.

In some examples of the method, apparatus, and non-transitory computer-readable medium described above, the beam sweeping configuration may be indicated to the UE through the second band or preconfigured via a signal through the first band.

Some examples of the method, apparatus, and non-transitory computer-readable medium described above may further include processes, features, means, or instructions for transmitting the second wakeup message using the second band, wherein the second wakeup message indicates the first wakeup message being transmitted using the first band. Some examples of the method, apparatus, and non-transitory computer-readable medium described above may further include processes, features, means, or instructions for transmitting the first wakeup message using the first band according to the indication in the second wakeup message.

Some examples of the method, apparatus, and non-transitory computer-readable medium described above may further include processes, features, means, or instructions for transmitting the first wakeup message using the first band according to a beam sweeping configuration. Some examples of the method, apparatus, and non-transitory computer-readable medium described above may further include processes, features, means, or instructions for transmitting the second wakeup message using the second band according to a non-beamforming configuration.

In some examples of the method, apparatus, and non-transitory computer-readable medium described above, the beam sweeping configuration comprises a plurality of transmit beams being transmitted in a subset of directions, the subset of directions selected according to a previous measurement report received from the UE.

In some examples of the method, apparatus, and non-transitory computer-readable medium described above, the first band comprises a mmW frequency band and the second band comprises a sub-6 GHz frequency band.

In some examples of the method, apparatus, and non-transitory computer-readable medium described above, the first band comprises a mmW RAT and the second band comprises a sub-6 GHz RAT.

In some examples of the method, apparatus, and non-transitory computer-readable medium described above, the first wakeup message comprises a physical downlink control channel (PDCCH) message, a CSI-RS, a DMRS, a TRS, a beam reference signal, a synchronization signal, or combinations thereof.

In some examples of the method, apparatus, and non-transitory computer-readable medium described above, the synchronization signal comprises a PSS, a SSS, a PBCH signal, or combinations thereof.

In some examples of the method, apparatus, and non-transitory computer-readable medium described above, the DRX mode comprises a connected discontinuous reception (C-DRX) mode. In some examples of the method, apparatus, and non-transitory computer-readable medium described above, the first wakeup message comprises a PDCCH message with cyclic redundancy check (CRC) bits scrambled using a cell radio network temporary identifier (C-RNTI) of the UE.

A method of wireless communication is described. The method may include receiving, from a base station and while operating in a DRX mode, a wakeup message on a second band, identifying that data is available to be transmitted on a first band to the UE based on the received wakeup message, and transmitting, based at least in part on the data being available, a signal to the base station using the first band.

An apparatus for wireless communication is described. The apparatus may include means for receiving, from a base station and while operating in a DRX mode, a wakeup message on a second band, means for identifying that data is available to be transmitted on a first band to the UE based on the received wakeup message, and means for transmitting, based at least in part on the data being available, a signal to the base station.

Another apparatus for wireless communication is described. The apparatus may include a processor, memory in electronic communication with the processor, and instructions stored in the memory. The instructions may be operable to cause the processor to receive, from a base station and while operating in a DRX mode, a wakeup message on a second band, identify that data is available to be transmitted on a first band to the UE based on the received wakeup message, and transmit, based at least in part on the data being available, a signal to the base station.

A non-transitory computer readable medium for wireless communication is described. The non-transitory computer-readable medium may include instructions operable to cause a processor to receive, from a base station and while operating in a DRX mode, a wakeup message on a second band, identify that data is available to be transmitted on a first band to the UE based on the received wakeup message, and transmit, based at least in part on the data being available, a signal to the base station.

In some examples of the method, apparatus, and non-transitory computer-readable medium described above, the signal comprises a beam recovery signal.

Some examples of the method, apparatus, and non-transitory computer-readable medium described above may further include processes, features, means, or instructions for receiving a plurality of beam swept signals from the base station during a beam management procedure. Some examples of the method, apparatus, and non-transitory computer-readable medium described above may further include processes, features, means, or instructions for identifying a beam index associated with at least one of the plurality of beam swept signals, the beam index corresponding to a transmit beam from the base station meeting a threshold level. Some examples of the method, apparatus, and non-transitory computer-readable medium described above may further include processes, features, means, or instructions for configuring the signal to indicate the beam index.

Some examples of the method, apparatus, and non-transitory computer-readable medium described above may further include processes, features, means, or instructions for identifying a beam sweeping configuration received from the base station, wherein the plurality of beam swept signals may be received according to the beam sweeping configuration.

In some examples of the method, apparatus, and non-transitory computer-readable medium described above, the beam sweeping configuration may be identified via a signal received on the second band or pre-configured via a signal received on the first band.

Some examples of the method, apparatus, and non-transitory computer-readable medium described above may further include processes, features, means, or instructions for monitoring the first band to detect an additional wakeup message. Some examples of the method, apparatus, and non-transitory computer-readable medium described above may further include processes, features, means, or instructions for determining that the additional wakeup message was not received on the first band. Some examples of the method, apparatus, and non-transitory computer-readable medium described above may further include processes, features, means, or instructions for monitoring the second band to receive the wakeup message based at least in part on the determining.

Some examples of the method, apparatus, and non-transitory computer-readable medium described above may further include processes, features, means, or instructions for transmitting a response message to the base station using the second band, the response message indicating that the UE received the additional wakeup message using the second band but did not receive the wakeup message using the first band.

In some examples of the method, apparatus, and non-transitory computer-readable medium described above, the first band comprises a mmW frequency band and the second band comprises a sub-6 GHz frequency band.

In some examples of the method, apparatus, and non-transitory computer-readable medium described above, the first band comprises a mmW RAT and the second band comprises a sub-6 GHz RAT.

In some examples of the method, apparatus, and non-transitory computer-readable medium described above, the first wakeup message comprises a PDCCH message, a CSI-RS, a DMRS, a TRS, a beam reference signal, a synchronization signal, or combinations thereof.

In some examples of the method, apparatus, and non-transitory computer-readable medium described above, the synchronization signal comprises a PSS, a SSS, a PBCH signal, or combinations thereof.

In some examples of the method, apparatus, and non-transitory computer-readable medium described above, the DRX mode comprises a C-DRX mode. In some examples of the method, apparatus, and non-transitory computer-readable medium described above, wherein the wakeup message comprises a PDCCH message with CRC bits scrambled using a C-RNTI of the UE.

DETAILED DESCRIPTION

Figure 1:
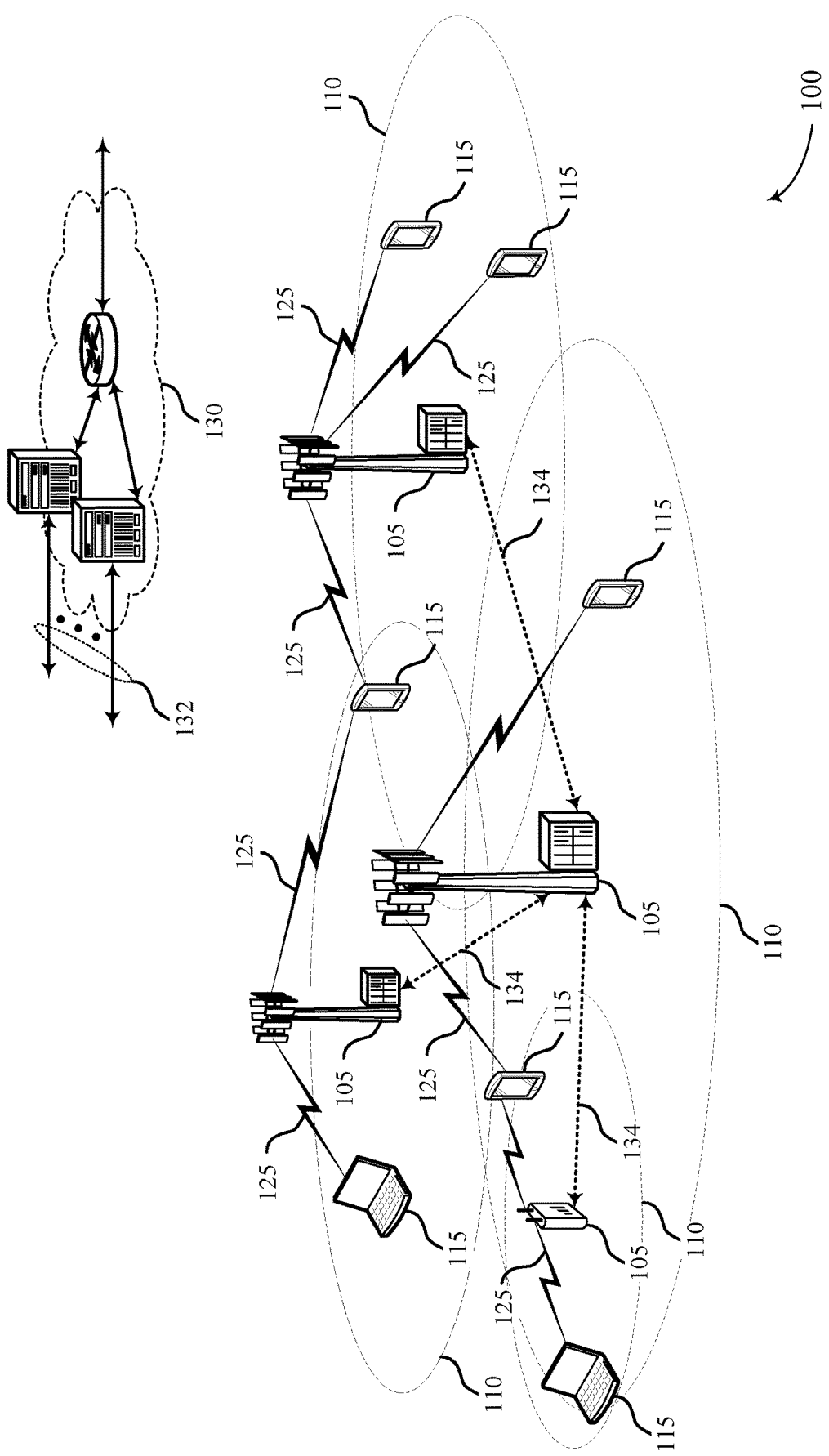
FIG. 1 illustrates an example of a system for wireless communication that supports transmission of a wakeup signal through millimeter wave (mmW) and sub-6 GHz bands in accordance with aspects of the present disclosure.

In some cases, a user equipment (UE) may monitor a wireless link continuously for an indication that the UE may receive data. In other cases (e.g., to conserve power and extend battery life), a UE may be configured with a discontinuous reception (DRX) mode. A DRX mode may include an active state (e.g., an On Duration) when the UE may monitor for control information (e.g., on a physical downlink control channel (PDCCH)) and a sleep state where the UE may power down some or all of its radio components. In some cases, a UE may be configured with a short DRX cycle and a long DRX cycle. In some cases, a UE may enter a long DRX cycle if it is inactive for one or more short DRX cycles.

In a millimeter wave (mmW) wireless communication system, the DRX process may be complicated by the fact that beam management may be performed between the UE and a mmW base station, e.g., a next generation nodeB (gNB). Beam management is a learning process and may include the gNB transmitting beam management beams to identify active beam(s) for communications between the UE and gNB (e.g., active transmit and receive beams at the gNB and/or the UE). In a DRX mode, the UE may move within the coverage area of the gNB while in the sleep state such that the active beam previously used for communications is no longer usable. Accordingly, the UE and/or gNB may be unsure which beam profile should be used for UE/gNB communications.

Aspects of the disclosure are initially described in the context of a wireless communications system. Generally, the disclosure provides for a base station to transmit wakeup signals/messages on multiple bands supported by the base station and UE. For example, a base station (e.g., a mmW base station such as a next-generation Node B or giga-nodeB (either of which may be referred to as a gNB) may transmit a first wakeup message on a first band and a second wakeup message on a second band. In some aspects, the first and second bands may refer to different radio spectrum frequency bands, different radio access technologies (RATs), and the like. Thus, the first band may refer to a mmW band/RAT and the second band may refer to a Long Term Evolution (LTE) or LTE-Advanced (LTE-A) band/RAT (e.g., a sub-6 GHz band).

The UE may monitor for the wakeup messages on the first and/or second band. For example, the UE may receive the first wakeup message on the first band and respond with a signal transmitted on the first band. However, because the UE may have moved and may no longer be able to receive beamformed communications using previously-established beams of the first band, the UE may not receive the first wakeup message. Instead, the UE may receive the second wakeup message on the second band and then respond with a signal transmitted on the first band. The response signal in this instance may indicate whether the first wakeup message was received on the first band, and may also be a beam recovery signal.

Aspects of the disclosure are further illustrated by and described with reference to apparatus diagrams, system diagrams, and flowcharts that relate to transmission of a wakeup signal through mmW and sub-6 GHz bands.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-A network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a gNB, a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

DRX cycles can be configured in the LTE downlink so that the UE does not have to decode the PDCCH or receive Physical Downlink Shared Channel (PDSCH) transmissions in certain subframes. In some cases, a UE 115 may monitor a wireless link 125 continuously for an indication that the UE 115 may receive data. In other cases (e.g., to conserve power and extend battery life) a UE 115 may be configured with a DRX cycle. A DRX cycle consists of an On Duration when the UE 115 may monitor for control information (e.g., on PDCCH) and a DRX period when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a DRX Inactivity Timer. If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a DRX Short Cycle Timer. When the DRX Short Cycle Timer expires, the UE 115 may resume a long DRX cycle.

In some aspects, a base station 105 may identify that data is available to be transmitted to a UE 115 that is operating in a DRX mode. The base station 105 may transmit, based at least in part on the data being available, a first wakeup message using a first band supported by the UE 115. The base station 105 may transmit, based at least in part on the data being available, a second wakeup message using a second band supported by the UE 115, the second band being different from the first band.

In some aspects, a UE 115 may receive, from a base station 105 and while operating in a DRX mode, a wakeup message on a second band. The UE 115 may identify that data is available to be transmitted on a first band to the UE 115 based on the received wakeup message. The UE 115 may transmit, based at least in part on the data being available, a signal to the base station 105.

Broadly, in a mmW network the base station 105 may transmit a wakeup signal through the pre-selected transmit beam and expect to receive an uplink signal from the UE 115 that is initiated based on the wakeup signal. The wakeup signal could be PDCCH/channel state information reference signal (CSI-RS), etc., and may be scrambled (e.g., the CRC bits of the PDCCH) by the cell radio network temporary identifier (C-RNTI) of the UE 115. The uplink resource may be pre-allocated to UE 115. The uplink resource may be a physical uplink control channel (PUCCH) resource to transmit ACK/NAK that corresponds to the transmitted PDCCH. The uplink resource could also be a beam report (e.g., reference signal received power (RSRP)) that corresponds to the transmitted CSI-RS. An advantage of transmitting the wakeup signal through the mmW band is that base station 105 may receive the ACK/NAK/beam report, if the current beam is good, within a short time. The mmW band may use higher tone spacing (60 KHz/120 KHz instead of 15 KHz/30 KHz of sub-6 GHz band) and shorter slots (250 us/125 us instead of 1 ms/500 us of sub-6 GHz band)).

The base station 105 may also transmit the wakeup signal through an LTE or 5G sub-6 GHz band (e.g., RRC). In some examples, the base station 105 may convey the wakeup messages through sub-6 and mmW simultaneously to reduce latency. In some examples, the base station 105 may convey the wakeup message through sub-6 only if it does not receive feedback from UE 115 in mmW.

If UE 115 cannot detect the wakeup message in mmW, the UE 115 may inform base station 105 through LTE/5G sub-6 that it can't detect the wakeup message through the preselected beam and base station 105 may perform beam management for this UE 115. Thus, the base station 105 may beam sweep the CSI-RS towards all or a subset of directions. The subset of directions may be selected based on previous reports from UE 115. The base station 105 may also listen (e.g., monitor) for beam recovery signals from the UE 115 in a sweeping manner, e.g., using different receive beam configurations. UE 115 may transmit the beam recovery signal based on the beam that it selected from the set of beams that base station 105 swept. The base station 105 may transmit the downlink traffic (e.g., data) towards that UE 115 using the reported beam.

Figure 2:
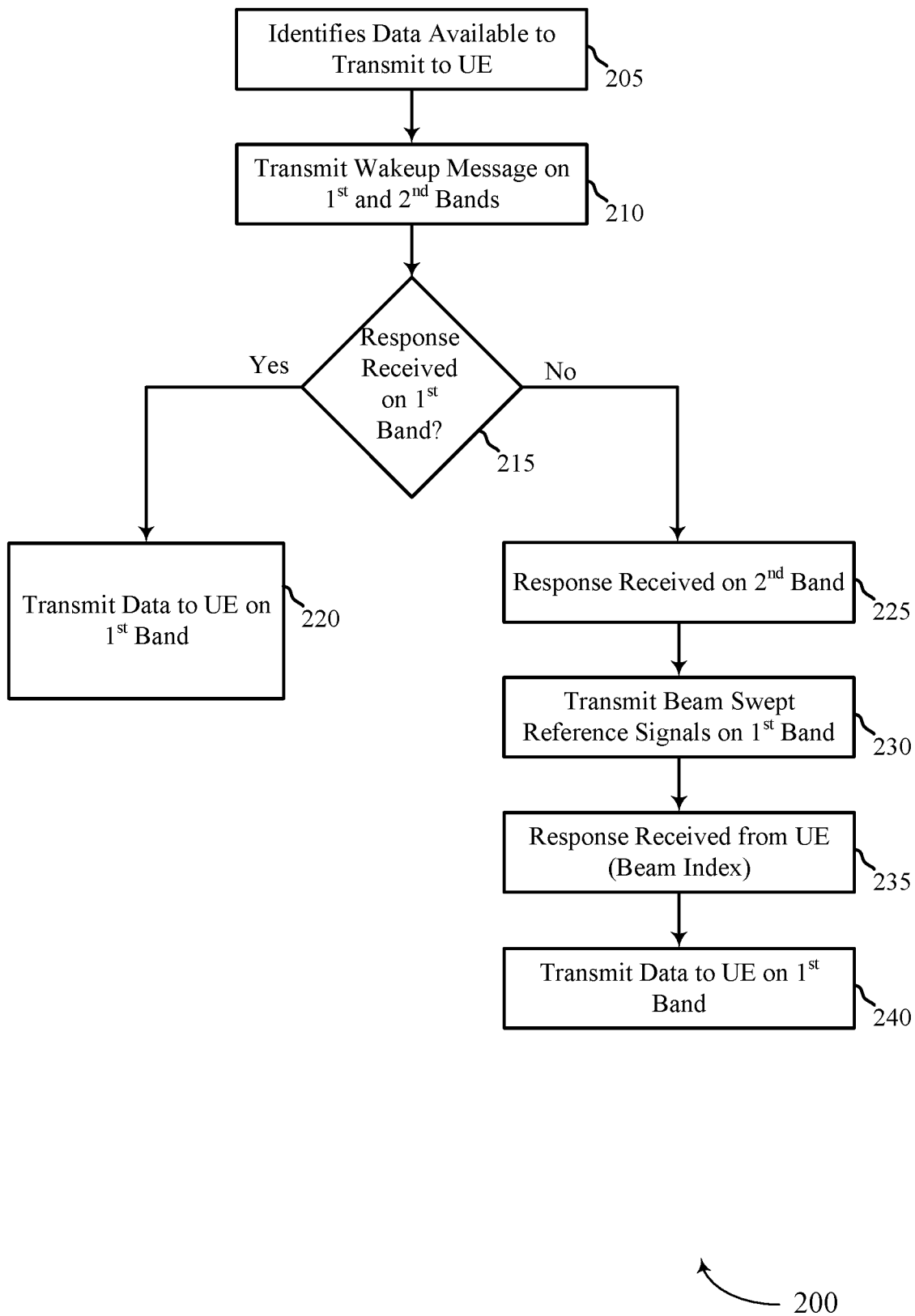
FIG. 2 illustrates an example of a method that supports transmission of a wakeup signal through mmW and sub-6 GHz bands in accordance with aspects of the present disclosure.

FIG. 2 illustrates an example of a method 200 that supports transmission of a wakeup signal through mmW and sub-6 GHz bands in accordance with various aspects of the present disclosure. In some examples, method 200 may implement aspects of wireless communication system 100. Aspects of method 200 may be implemented by a base station and/or a UE, which may be examples of the corresponding devices described herein.

In some aspects, a base station may beam sweep a set of signals (e.g. CSI-RS/PDCCH) using different transmit beams so that the UE can identify the best transmit beam of the base station. The UE may indicate this best transmit beam to the base station and the base station may use that transmit beam to communicate with the UE. However, in the absence of any other signaling, the UE may try to detect the beam swept signals. The expected duration of a beam swept signal may be a few slots, in some examples, and the UE's search for these signals may consume an excessive amount of power by the UE. However, if the base station is connected to the UE via sub-6 band (e.g., an LTE or 5G NR connection) as well, the base station may transmit the wakeup signal to the UE via the sub-6 band (in addition to its beam-swept transmission). Should the UE receive the sub-6 wakeup signal, the UE may be able to determine that a beam training procedure is to be performed in order to re-establish beamformed communications with the base station. This may save power at the UE, e.g., a beam training procedure will not have to be performed when the base station has no data to transmit to the UE.

Thus, at 205 the base station may identify that it has data available to be transmitted to the UE. For example, the base station may determine that it has data stored in one or more buffers having a destination address associated with the UE. The UE may be operating in a DRX mode, such as a C-DRX mode. The DRX mode may have an associated On Duration where the UE monitors for wakeup signal(s) from the base station.

At 210, the base station may transmit a first wakeup message on a first band and a second wakeup message on a second band. The first and second wakeup messages may be transmitted in response to the data being available to transmit to the UE. The UE may support communicating on the first and second bands. The first band may be a mmW band and the second band may be a sub-6 GHz band (e.g., an LTE or 5G NR RAT).

In some aspects, the base station may transmit the first and second wakeup messages at substantially the same time. For example, the base station may default to always transmitting the first wakeup message on the first band and the second wakeup message on the second band whenever there is data available to transmit to the UE.

In some aspects, the base station may configure the second wakeup message to carry or otherwise convey an indication that the first wakeup message is being transmitted in the first band. For example, the base station may set one or more bits in the second wakeup message to indicate the first wakeup message transmission in the first band. This indication may be used by a UE to trigger monitoring the first band for receipt of the first wakeup message.

In some aspects, the base station may transmit the first wakeup message on the first band using a beamformed signal. For example, the base station may use a beam sweeping configuration to transmit the first wakeup message on the first band using a transmit beam with a predetermined beam width. The beam sweeping configuration may include multiple transmit beams being transmitted in every available transmit direction. The beam sweeping configuration may include multiple transmit beams being transmitted in a subset of available directions. For example, the base station may use previous location information, measurement reports, and the like, to identify the subset of directions that the UE is likely to be located in and transmit the first wakeup message in the subset of directions.

In some aspects, the second wakeup message transmitted in the second band may not be beamformed. For example, the second wakeup message may be transmitted in an omni-direction transmission, a pseudo-omni directional transmission (e.g., within a cell), and the like.

In some aspects, the first band may be a mmW band and the second band may be a sub-6 GHz band. In some aspects, the first band may be a mmW RAT and the second band may be a sub-6 GHz RAT.

In some aspects, the first wakeup message may be (or be transmitted in) any combination of a PDCCH message, a CSI-RS, a demodulation reference signal (DMRS), a tracking reference signal (TRS), a beam reference signal (BRS), a synchronization signal (e.g., PSS, SSS, PBCH signal), and the like.

Moreover, in some instances the base station may cooperate with a neighboring base station to transmit the first and second wakeup messages on the first and second bands, respectively. For example, the base station may be a micro base station that transmits the first wakeup message on the first band and the neighboring base station may be a macro (or femto) base station that transmits the second wakeup message on the second band. The base station and neighboring base station may coordinate actions depending upon what, if any, response(s) are received from the UE.

As 215, the base station may determine whether a response was received on the first band. For example, receiving a response may include the base station receiving a signal from the UE on the first band. The signal may carry or otherwise convey an indication of a beam index associated with a transmit beam of the bases station. For example, the base station may beam sweep the PDCCH/CSI-RS messages to the UE using a plurality of transmit beams, with each transmit beam being transmitted in a different direction. The UE may identify which transmit beam was received with the highest receive power level, with the lowest interference level, and the like. The UE may configure the response signal to indicate the beam index of the best transmit beam. One example of the response signal may include a beam recovery signal (if, for example, the UE received the wakeup message on the first band but determined that beam recovery would still be beneficial).

In response to receiving the signal from the UE, at 220 the base station may transmit the data to the UE. For example, the base station may use the transmit beam indicated in the response signal to transmit the data to the UE.

If no response was received on the first band, at 225 the base station may receive a response on the second band. For example, the base station may receive a response message from the UE indicating that the UE received the second wakeup message, but did not receive the first wakeup message on the first band. In some instances, the response may not indicate whether the UE received the first wakeup message on the first band. In response to the indication and at 230, the base station may transmit a set of reference signals in a beam sweeping configuration to the UE. The set of reference signals may include CSI-RSs, and the like, and may carry or otherwise convey the first wakeup message. In some aspects, the UE may be preconfigured with the beam sweeping configuration for the set of reference signals (e.g., via signaling received on the first band) or may receiving an indication of the beam sweeping configuration on the second band.

At 235, the base station may receive a beam recovery signal in response to the set of beam swept reference signals that carries or otherwise conveys an indication of the best transmit beam (e.g., the beam index) from the set of reference signals. Accordingly, at 240 the base station may use the beam index to identify the transmit beam to use to transmit the data to the UE.

Although not shown in FIG. 2, in some aspects the base station may not receive a response from the UE on the first band or the second band. In this instance, the base station may take several steps, either alone or in combination. For example, the base station may retransmit the first wakeup message on the first band and the second wakeup message on the second band. The base station may expand the subset of directions that the first wakeup message is transmitted in on the first band. The base station may coordinate with a neighboring base station to have the neighboring base station transmit the first wakeup message on the first band and the second wakeup message on the second band. The base station may initiate a handover procedure to the neighboring base station so that the neighboring base station may perform the described wakeup procedures.

Figure 3:
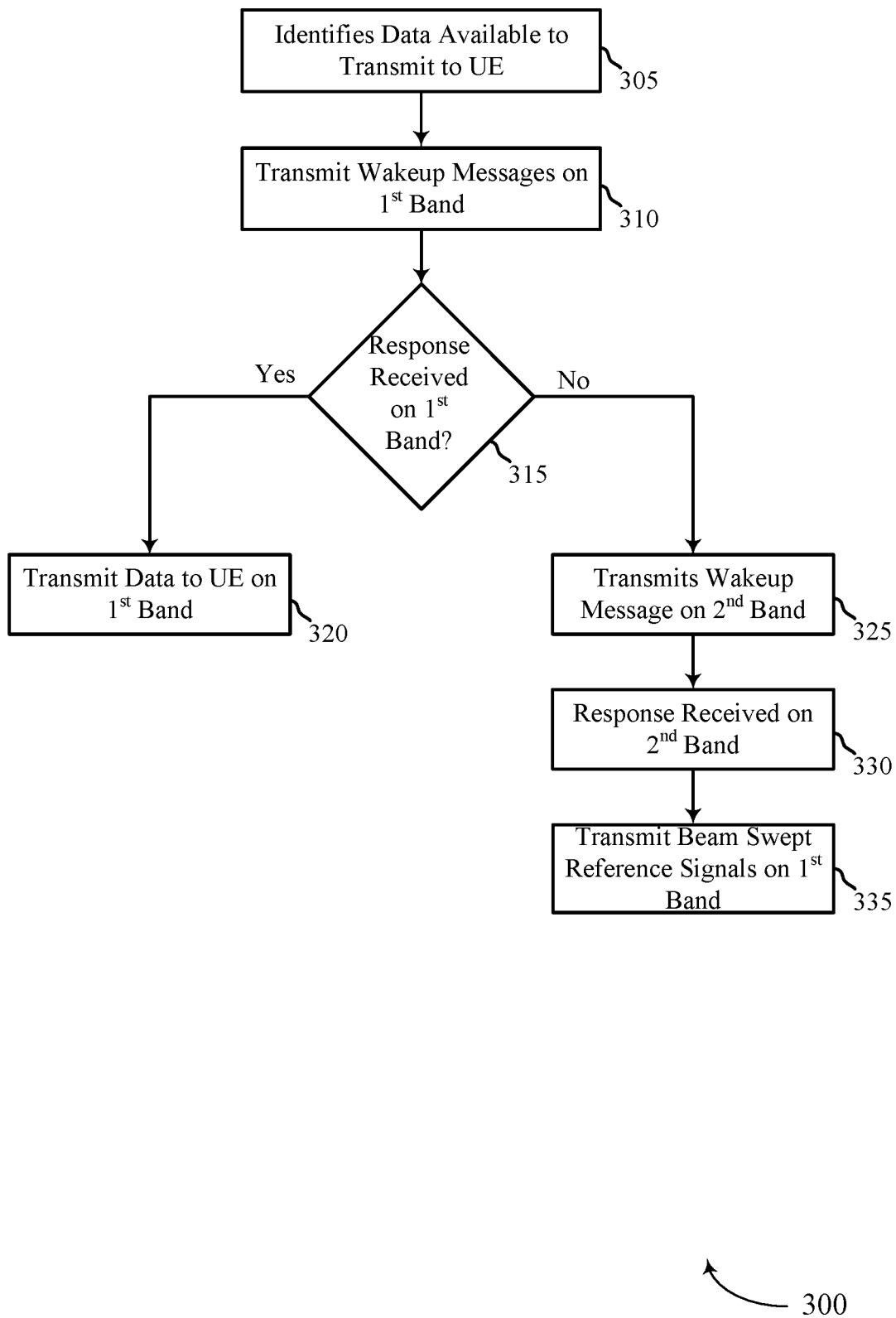
FIG. 3 illustrates an example of a method that supports transmission of a wakeup signal through mmW and sub-6 GHz bands in accordance with aspects of the present disclosure.

FIG. 3 illustrates an example of a method 300 that supports transmission of a wakeup signal through mmW and sub-6 GHz bands in accordance with various aspects of the present disclosure. In some examples, method 300 may implement aspects of wireless communication system 100 and/or method 200. Aspects of method 300 may be implemented by a base station and/or a UE, which may be examples of the corresponding devices described herein. Generally, method 300 illustrates one example where the base station transmits the first wakeup message on the first band, waits to see if a response is received from the UE on the first band, and then transmits the second wakeup message on the second band if no response was received on the first band.

At 305, the base station may identify that it has data available to be transmitted to the UE. For example, the base station may determine that it has data stored in one or more buffers having a destination address associated with the UE. The UE may be operating in a DRX mode, such as a C-DRX mode. The DRX mode may have an associated On Duration where the UE monitors for wakeup signal(s) from the base station.

At 310, the base station may transmit a first wakeup message on a first band. The first wakeup message may be transmitted in response to the data being available to transmit to the UE. The first band may be a mmW band and the second band may be a sub-6 GHz band (e.g., an LTE or 5G NR RAT).

In some aspects, the base station may transmit the first wakeup message on the first band using a beamformed signal. For example, the base station may use a beam sweeping configuration to transmit the first wakeup message on the first band using a transmit beam with a predetermined beam width. The beam sweeping configuration may include multiple transmit beams being transmitted in every available transmit direction. The beam sweeping configuration may include multiple transmit beams being transmitted in a subset of available directions. For example, the base station may use previous location information, measurement reports, and the like, to identify the subset of directions that the UE is likely to be located in and transmit the first wakeup message in the subset of directions.

As 315, the base station may determine whether a response was received on the first band. For example, receiving a response may include the base station receiving a signal from the UE on the first band. The signal may carry or otherwise convey an indication of a beam index associated with a transmit beam of the bases station. For example, the base station may beam sweep the PDCCH/CSI-RS messages (e.g., multiple instances of the first wakeup message) to the UE using a plurality of transmit beams, with each transmit beam being transmitted in a different direction. The UE may identify which transmit beam was received with the highest receive power level, with the lowest interference level, and the like. The UE may configure the response signal to indicate the beam index of the best transmit beam. One example of the response signal may include a beam recovery signal (if, for example, the UE received the wakeup message on the first band but determined that beam recovery would still be beneficial).

In response to receiving the signal from the UE, at 320 the base station may transmit the data to the UE. For example, the base station may use the transmit beam indicated in the response signal to transmit the data to the UE.

If no response was received on the first band, at 325 the base station may transmit the second wakeup message on the second band. In some aspects, the second wakeup message transmitted in the second band may not be beamformed. For example, the second wakeup message may be transmitted in an omni-direction transmission, a pseudo-omni directional transmission (e.g., within a cell), and the like.

In some instances, the base station may cooperate with a neighboring base station to transmit the first and second wakeup messages on the first and second bands, respectively. For example, the base station may be a micro base station that transmits the first wakeup message on the first band and the neighboring base station may be a macro (or femto) base station that transmits the second wakeup message on the second band, or vice versa. The base station and neighboring base station may coordinate actions depending upon what, if any, response(s) are received from the UE.

At 330, the base station may receive a response on the second band. For example, the base station may receive a response message from the UE indicating that the UE received the second wakeup message, but did not receive the first wakeup message on the first band. In some instances, the response may not indicate whether the UE received the first wakeup message on the first band. In response to the indication and at 330, the base station may transmit a set of reference signals in a beam sweeping configuration to the UE. The set of reference signals may include CSI-RSs, and the like, and may carry or otherwise convey the first wakeup message. In some aspects, the UE may be preconfigured with the beam sweeping configuration for the set of reference signals (e.g., via signaling received on the first band) or may receiving an indication of the beam sweeping configuration on the second band.

In some aspects, the base station may receive a beam recovery signal in response to the set of reference signals that carries or otherwise conveys an indication of the best transmit beam (e.g., the beam index) from the set of reference signals. Accordingly, the base station may use the beam index to identify the transmit beam to use to transmit the data to the UE.

Although not shown in FIG. 3, in some aspects the base station may not receive a response from the UE on the first band or the second band. In this instance, the base station may take several steps, either alone or in combination. For example, the base station may retransmit the first wakeup message on the first band and the second wakeup message on the second band. The base station may expand the subset of directions that the first wakeup message is transmitted in on the first band. The base station may coordinate with a neighboring base station to have the neighboring base station transmit the first wakeup message on the first band and the second wakeup message on the second band. The base station may initiate a handover procedure to the neighboring base station so that the neighboring base station may perform the described wakeup procedures.

Figure 4:
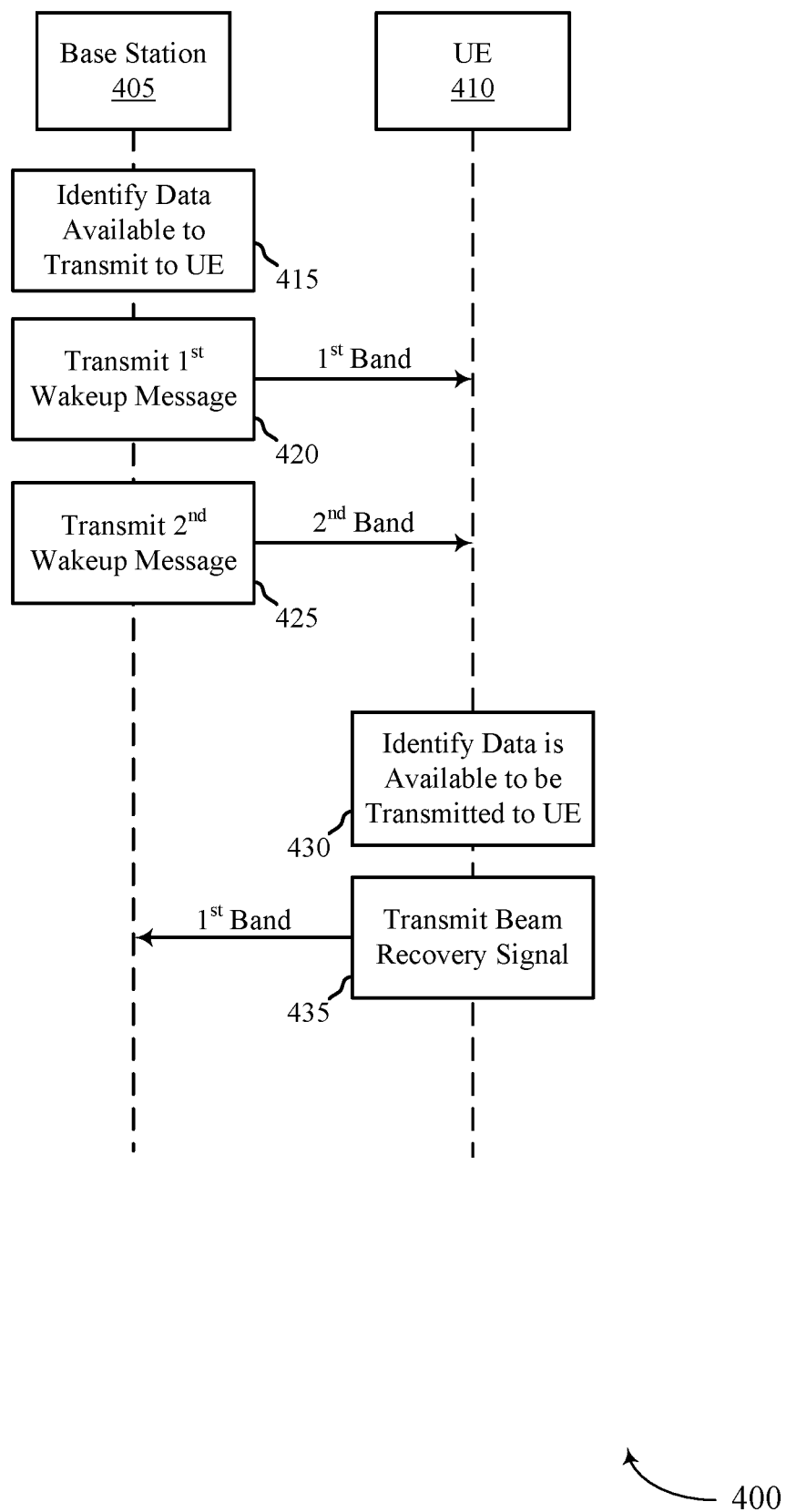
FIG. 4 illustrates an example of a process that supports transmission of a wakeup signal through mmW and sub-6 GHz bands in accordance with aspects of the present disclosure.

FIG. 4 illustrates an example of a process 400 that supports transmission of a wakeup signal through mmW and sub-6 GHz bands in accordance with various aspects of the present disclosure. In some examples, process 400 may implement aspects of wireless communication system 100 and/or methods 200/300. Process 400 may include a base station 405 and a UE 410, which may be examples of the corresponding devices described herein.

At 415, the base station 405 may identify that it has data available to transmit to the UE 410. The UE 410 may be operating in a DRX mode (e.g., a C-DRX mode) where the UE 410 transitions to an On Duration of the DRX mode to monitor for a wakeup message from the base station 405.

At 420, the base station 405 may transmit the first wakeup message to the UE 410 on the first band. The first wakeup message may be transmitted in a beam sweeping configuration to the UE 410.

At 425, the base station 405 may transmit the second wakeup message to the UE 410 on the second band. The second wakeup message may be transmitted to the UE 410 in a non-beamforming configuration, e.g., in an omni-direction transmission, within a cell coverage area, and the like.

In some aspects, the first wakeup message and the second wakeup message may be transmitted at the same time. In some aspects, the second wakeup message may be transmitted if there is no response to the first wakeup message transmitted on the first band. In some aspects, the second wakeup message may indicate that the first wakeup message is being (or has been) transmitted on the first band.

At 430, the UE 410 may identify that the base station 405 has data available to transmit to the UE 410. For example, the UE 410 may receive the first wakeup message on the first band and identify that data is available to be transmitted to the UE 410 on the first band. As another example, the UE 410 may receive the second wakeup message on the second band and identify that data is available to be transmitted to the UE 410 on the first band.

In some aspects, the UE 410 may monitor the first band to detect the first wakeup message and, if not received, then monitor the second band to detect the second wakeup message.

At 435, the UE 410 may transmit a signal (e.g., a beam recovery signal) to the base station 405 using the first band and in response to the data available for transmit to the UE 410. Thus, the base station 405 may receive a signal on the first band. The signal may indicate a beam index of a transmit beam of the base station (e.g., a transmit beam that is part of a set of beam swept reference signals from the base station 405). The beam index may identify the best transmit beam from the base station 405 (e.g., from the perspective of the UE 410) and the base station 405 may use the beam index to transmit the available data to the UE 410.

In some aspects, the response signal may carry or otherwise convey an indication that the UE received the second wakeup message on the second band, but did not receive the first wakeup message on the first band. Accordingly, the base station 405 may transmit a set of reference signals (e.g., CSI-RSs) using the first band and according to a beam sweeping configuration. The UE 410 may transmit a response to the set of beam swept reference signals that indicates the best transmit beam. The transmitted set of reference signals may be a part of a beam management procedure between the base station 405 and the UE 410 that supports the UE 410 identifying the best transmit beam from the base station 405.

Figure 5:
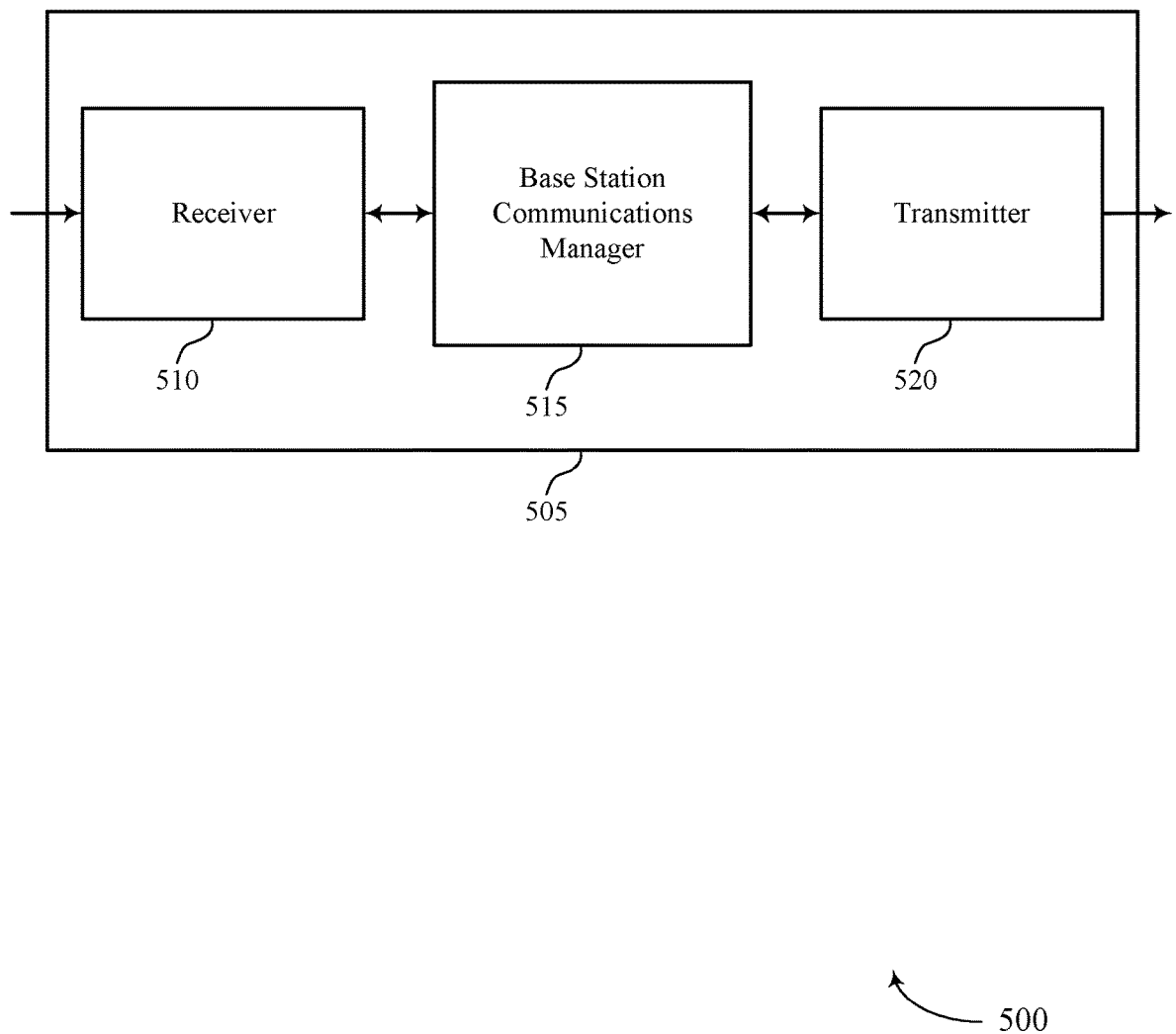
FIGS. 5 through 7 show block diagrams of a device that supports transmission of a wakeup signal through mmW and sub-6 GHz bands in accordance with aspects of the present disclosure.

FIG. 5 shows a block diagram 500 of a wireless device 505 that supports transmission of a wakeup signal through mmW and sub-6 GHz bands in accordance with aspects of the present disclosure. Wireless device 505 may be an example of aspects of a base station, as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmission of a wakeup signal through mmW and sub-6 GHz bands, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify that data is available to be transmitted to a UE that is operating in a DRX mode. Base station communications manager 515 may transmit, based on the data being available, a first wakeup message using a first band supported by the UE. Base station communications manager 515 may transmit, based on the data being available, a second wakeup message using a second band supported by the UE, the second band being different from the first band.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
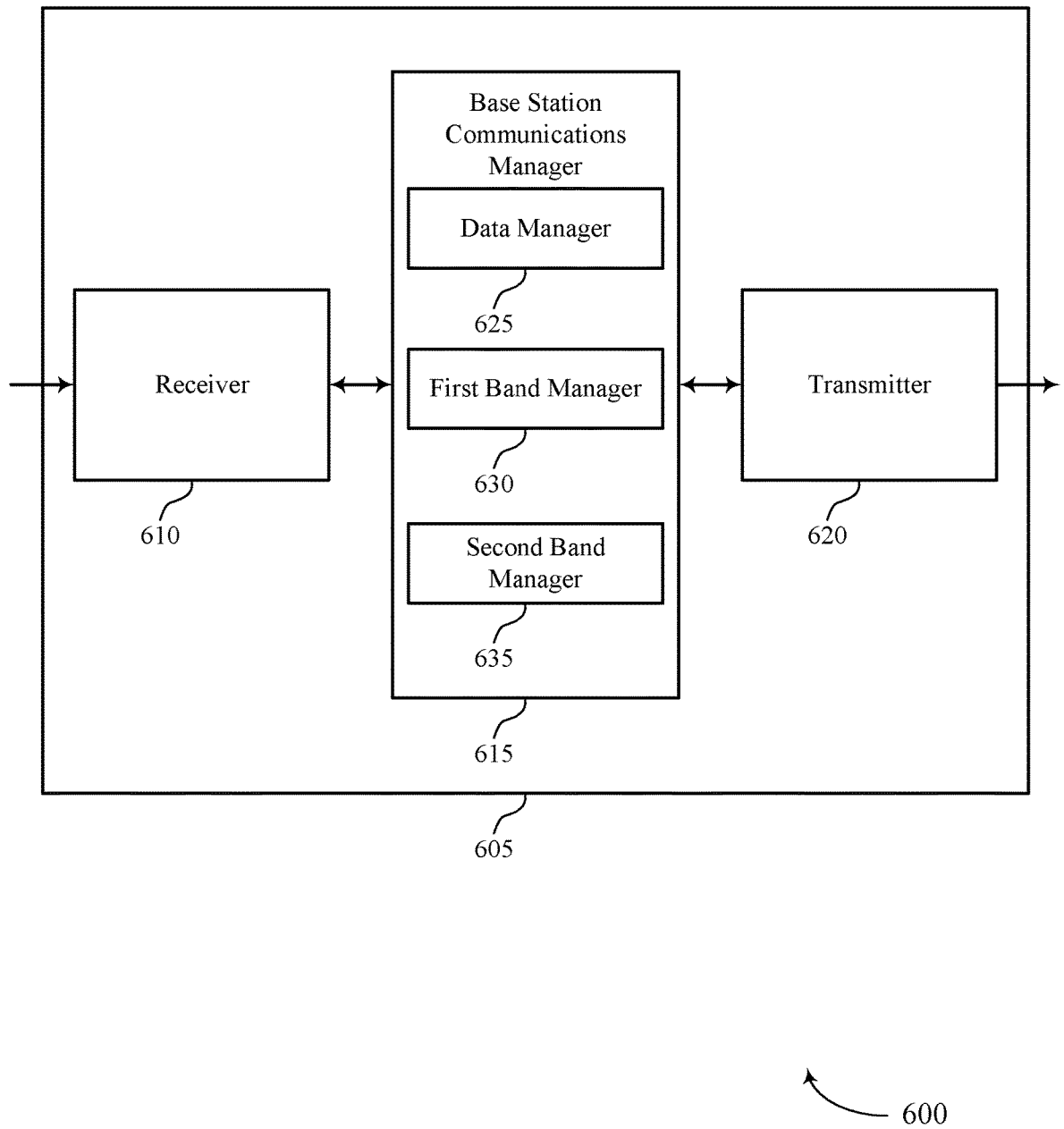

FIG. 6 shows a block diagram 600 of a wireless device 605 that supports transmission of a wakeup signal through mmW and sub-6 GHz bands in accordance with aspects of the present disclosure. Wireless device 605 may be an example of aspects of a wireless device 505 or a base station, as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to transmission of a wakeup signal through mmW and sub-6 GHz bands, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include data manager 625, first band manager 630, and second band manager 635.

Data manager 625 may identify that data is available to be transmitted to a UE that is operating in a DRX mode.

First band manager 630 may transmit, based on the data being available, a first wakeup message using a first band supported by the UE. In some cases, the first band includes a mmW frequency band and the second band includes a sub-6 GHz frequency band. In some cases, the first band includes a mmW RAT and the second band includes a sub-6 GHz RAT. In some cases, the first wakeup message includes a PDCCH message, a CSI-RS, a DMRS, a TRS, a beam reference signal, a synchronization signal, or combinations thereof. In some cases, the synchronization signal includes a PSS, a SSS, a PBCH signal, or combinations thereof. In some cases, the DRX mode includes a C-DRX mode.

Second band manager 635 may transmit, based on the data being available, a second wakeup message using a second band supported by the UE, the second band being different from the first band.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
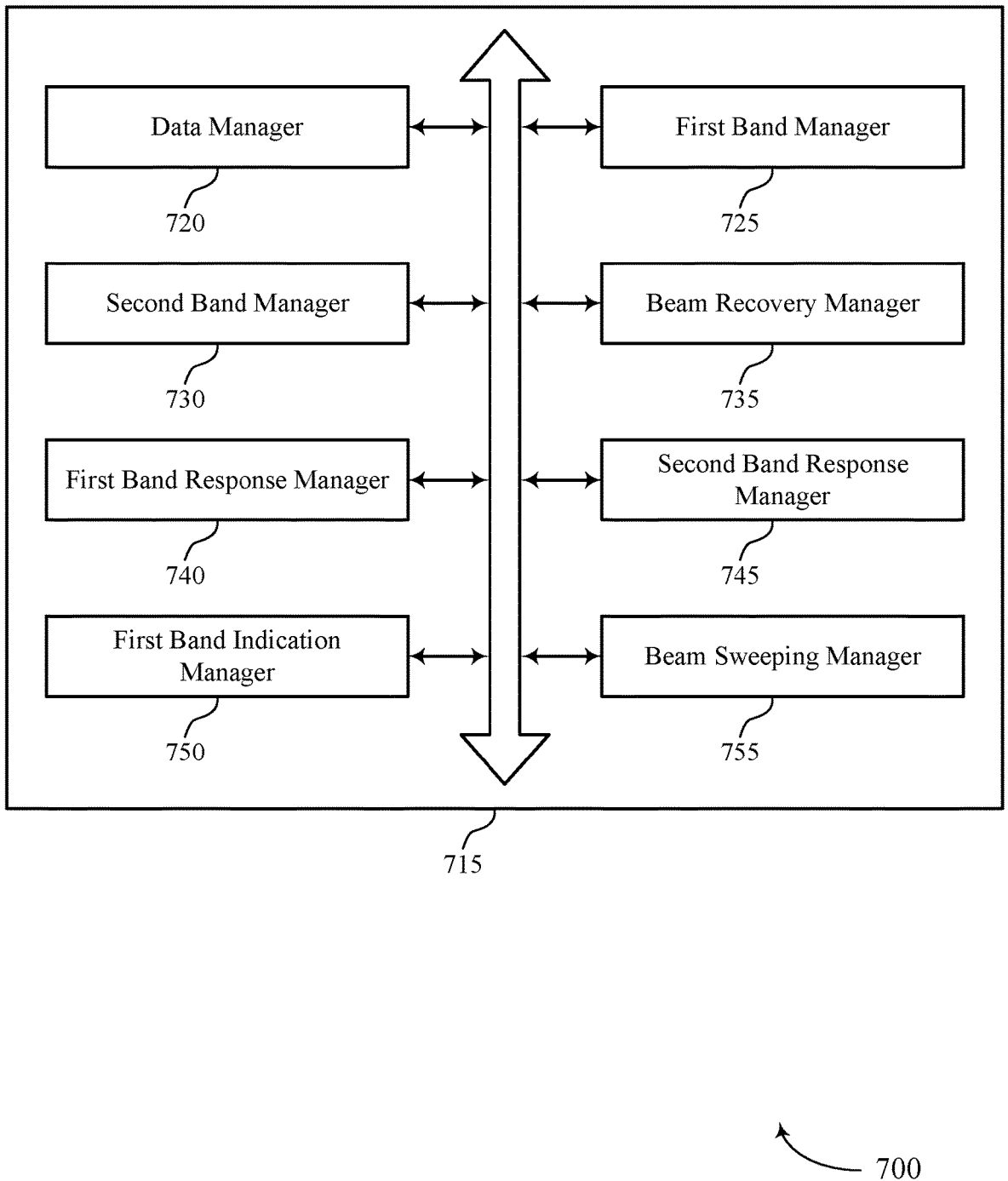

FIG. 7 shows a block diagram 700 of a base station communications manager 715 that supports transmission of a wakeup signal through mmW and sub-6 GHz bands in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include data manager 720, first band manager 725, second band manager 730, beam recovery manager 735, first band response manager 740, second band response manager 745, first band indication manager 750, and beam sweeping manager 755. Each of these modules may communicate, directly or indirectly, with one another (e.g., via one or more buses).

Data manager 720 may identify that data is available to be transmitted to a UE that is operating in a DRX mode.

First band manager 725 may transmit, based on the data being available, a first wakeup message using a first band supported by the UE. In some cases, the first band includes a mmW frequency band and the second band includes a sub-6 GHz frequency band. In some cases, the first band includes a mmW RAT and the second band includes a sub-6 GHz RAT. In some cases, the first wakeup message includes a PDCCH message, a CSI-RS, a DMRS, a TRS, a beam reference signal, a synchronization signal, or combinations thereof. In some cases, the synchronization signal includes a PSS, a SSS, a PBCH signal, or combinations thereof. In some cases, the DRX mode includes a C-DRX mode.

Second band manager 730 may transmit, based on the data being available, a second wakeup message using a second band supported by the UE, the second band being different from the first band.

Beam recovery manager 735 may receive a signal on the first band, the signal indicating a beam index associated with a transmit beam of the base station and transmit the available data to the UE using the first band and according to the beam index received in the signal. In some cases, the signal includes a beam recovery signal.

First band response manager 740 may determine that a response message was not received on the first band and transmit the second wakeup message using the second band based on the determination. In some cases, the first wakeup message and the second wakeup message are sent at substantially the same time.

Second band response manager 745 may receive a response message from the UE using the second band, the response message indicating that the UE received the second wakeup message using the second band but did not receive the first wakeup message using the first band. Second band response manager 745 may transmit a set of reference signals using the first band and according to a beam sweeping configuration, receive a beam recovery signal in response to the set of reference signals, the beam recovery signal including a beam index associated with a transmit beam from the set of reference signals. Second band response manager 745 may transmit the available data to the UE using the first band and according to the beam index received in the beam recovery signal. In some cases, the beam sweeping configuration is indicated to the UE through the second band or preconfigured via a signal through the first band.

First band indication manager 750 may transmit the second wakeup message using the second band, where the second wakeup message indicates the first wakeup message being transmitted using the first band. First band indication manager 750 may transmit the first wakeup message using the first band according to the indication in the second wakeup message.

Beam sweeping manager 755 may transmit the first wakeup message using the first band according to a beam sweeping configuration and transmit the second wakeup message using the second band according to a non-beamforming configuration. In some cases, the beam sweeping configuration includes a set of transmit beams being transmitted in a subset of directions, the subset of directions selected according to a previous measurement report received from the UE.

Figure 8:
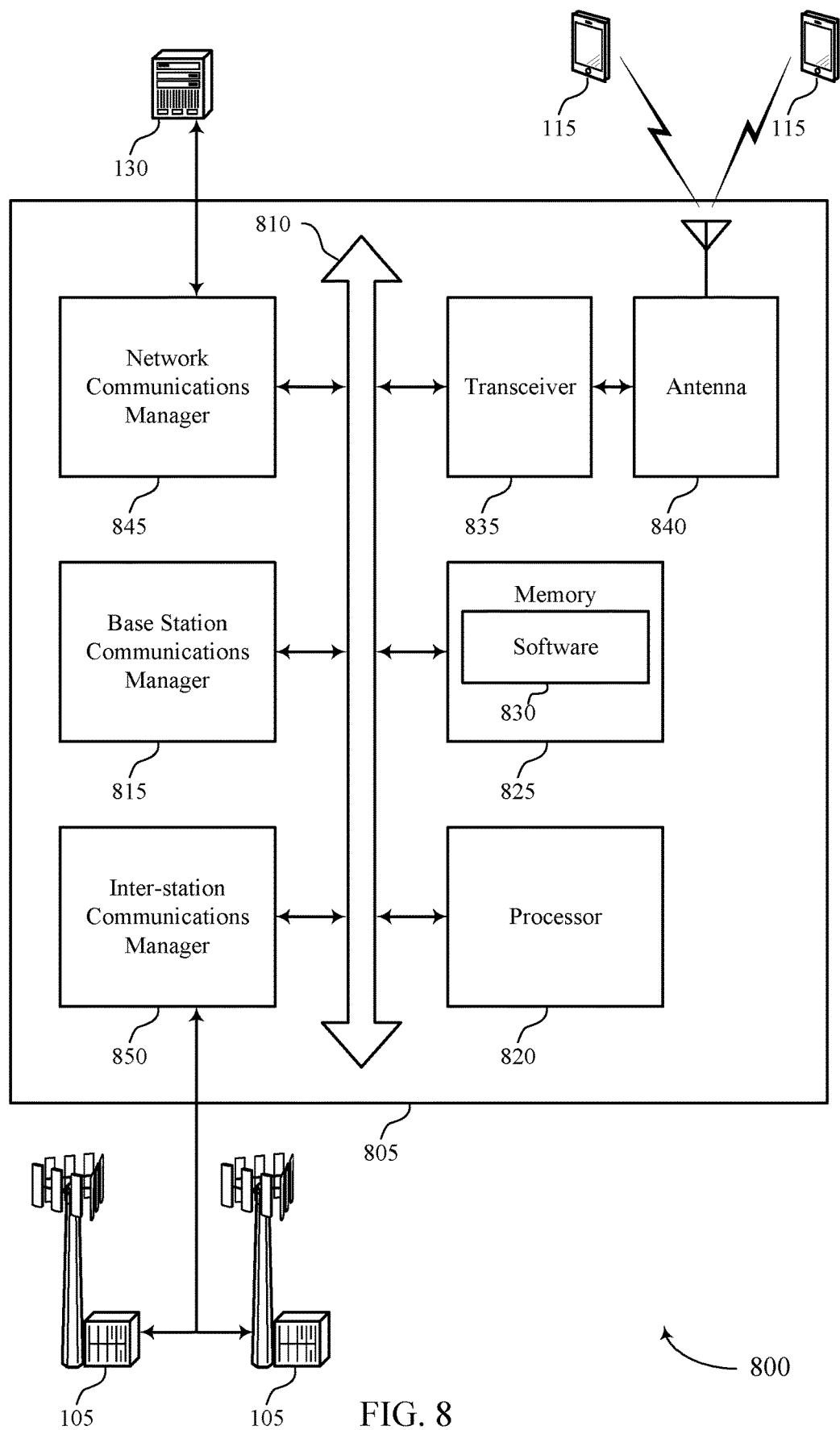
FIG. 8 illustrates a block diagram of a system including a base station that supports transmission of a wakeup signal through mmW and sub-6 GHz bands in accordance with aspects of the present disclosure.

FIG. 8 shows a diagram of a system 800 including a device 805 that supports transmission of a wakeup signal through mmW and sub-6 GHz bands in accordance with aspects of the present disclosure. Device 805 may be an example of or include the components of wireless device 505, wireless device 605, or a base station, as described herein. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmission of a wakeup signal through mmW and sub-6 GHz bands).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support transmission of a wakeup signal through mmW and sub-6 GHz bands. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
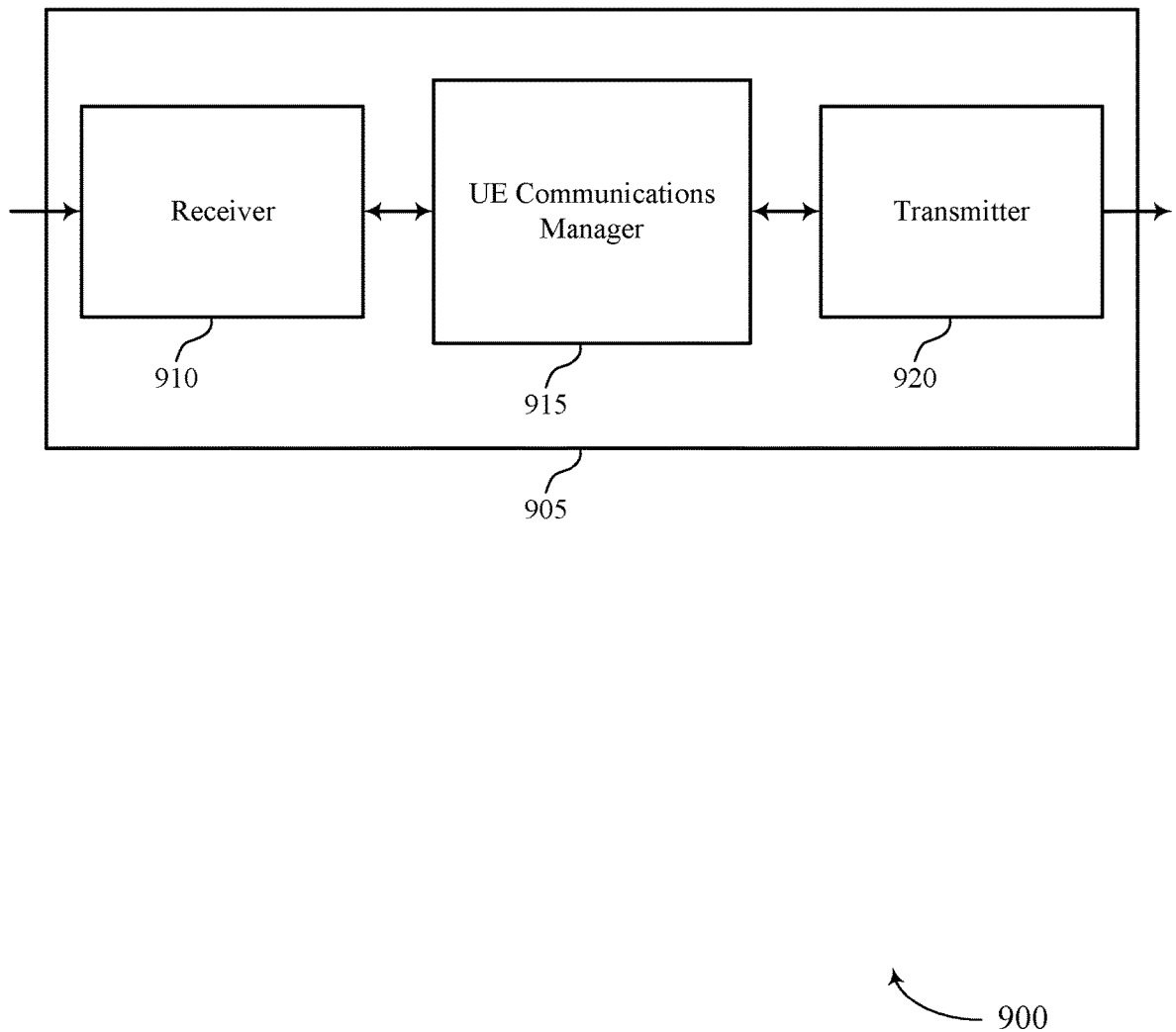
FIGS. 9 through 11 show block diagrams of a device that supports transmission of a wakeup signal through mmW and sub-6 GHz bands in accordance with aspects of the present disclosure.

FIG. 9 shows a block diagram 900 of a wireless device 905 that supports transmission of a wakeup signal through mmW and sub-6 GHz bands in accordance with aspects of the present disclosure. Wireless device 905 may be an example of aspects of a UE, as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to transmission of a wakeup signal through mmW and sub-6 GHz bands, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, from a base station and while operating in a DRX mode, a wakeup message on a second band. UE communications manager 915 may identify that data is available to be transmitted on a first band to the UE based on the received wakeup message. UE communications manager 915 may transmit, based on the data being available, a signal to the base station.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
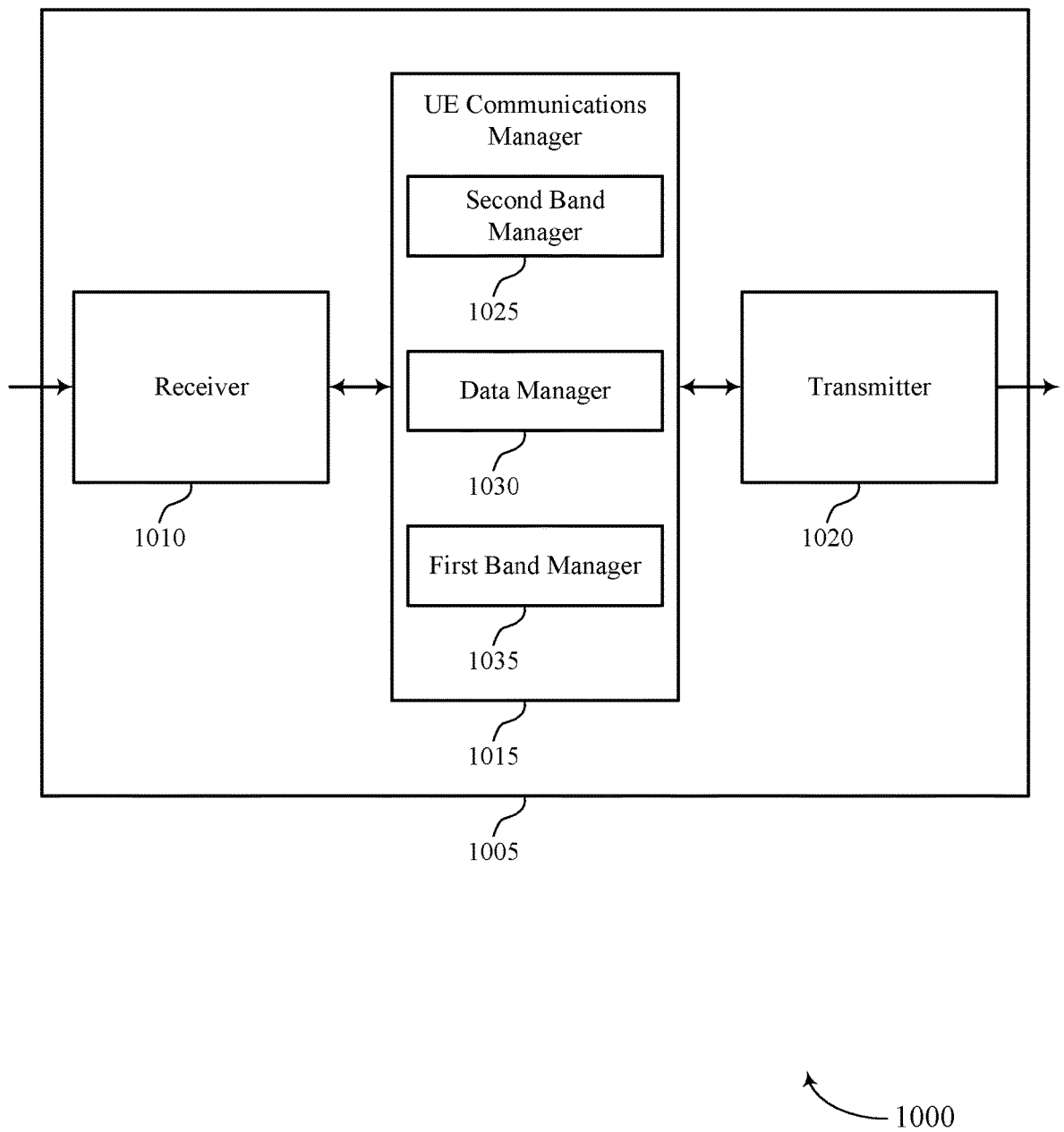

FIG. 10 shows a block diagram 1000 of a wireless device 1005 that supports transmission of a wakeup signal through mmW and sub-6 GHz bands in accordance with aspects of the present disclosure. Wireless device 1005 may be an example of aspects of a wireless device 905 or a UE, as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to transmission of a wakeup signal through mmW and sub-6 GHz bands, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include second band manager 1025, data manager 1030, and first band manager 1035.

Second band manager 1025 may receive, from a base station and while operating in a DRX mode, a wakeup message on a second band.

Data manager 1030 may identify that data is available to be transmitted on a first band to the UE based on the received wakeup message.

First band manager 1035 may transmit, based on the data being available, a signal to the base station. In some cases, the signal includes a beam recovery signal. In some cases, the first band includes a mmW frequency band and the second band includes a sub-6 GHz frequency band. In some cases, the first band includes a mmW RAT and the second band includes a sub-6 GHz RAT. In some cases, the first wakeup message includes a PDCCH message, a CSI-RS, a DMRS, a TRS, a beam reference signal, a synchronization signal, or combinations thereof. In some cases, the synchronization signal includes a PSS, a SSS, a PBCH signal, or combinations thereof. In some cases, the DRX mode includes a C-DRX mode.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
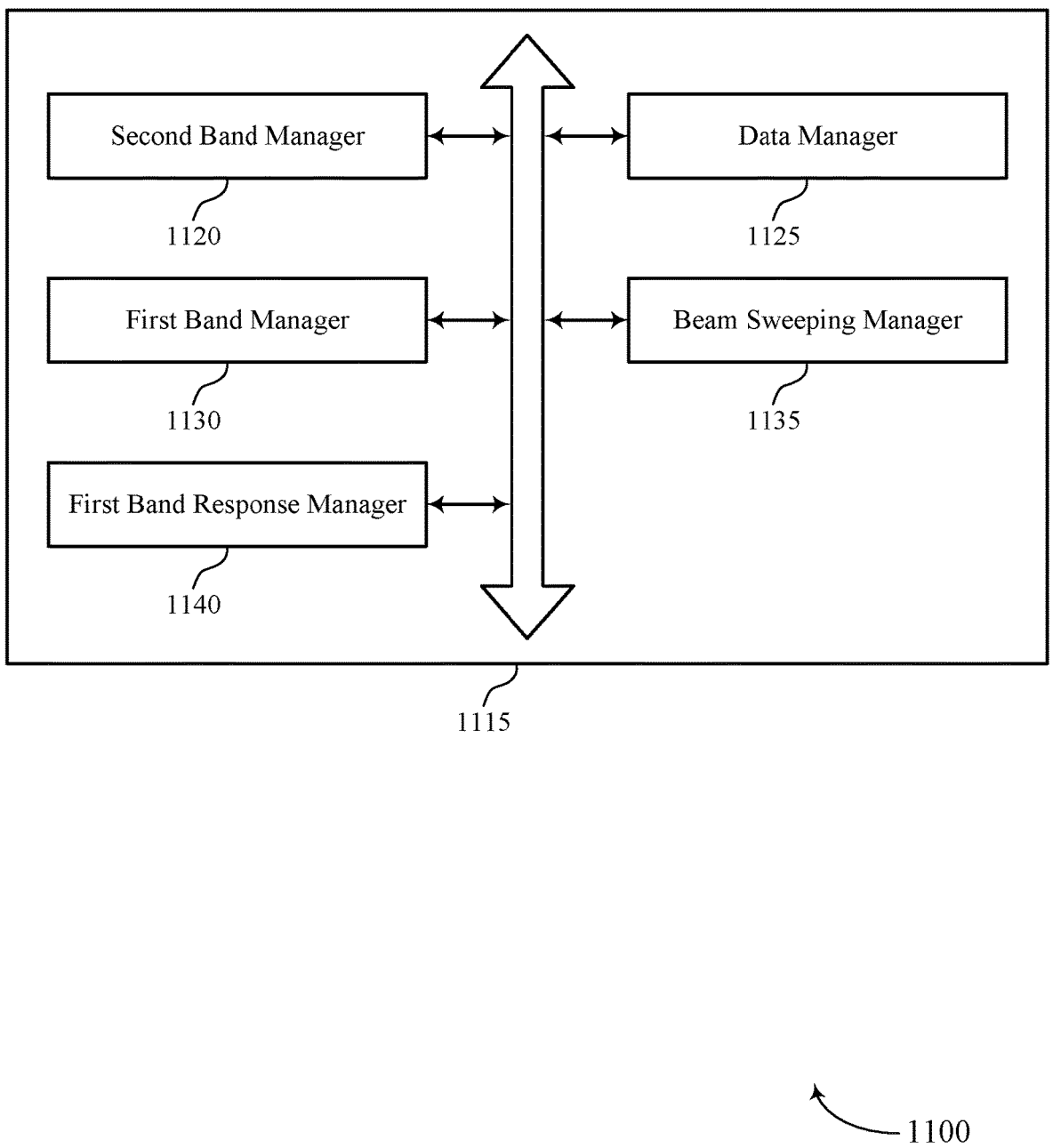

FIG. 11 shows a block diagram 1100 of a UE communications manager 1115 that supports transmission of a wakeup signal through mmW and sub-6 GHz bands in accordance with aspects of the present disclosure. The UE communications manager 1115 may be an example of aspects of a UE communications manager 1215 described with reference to FIGS. 9, 10, and 12. The UE communications manager 1115 may include second band manager 1120, data manager 1125, first band manager 1130, beam sweeping manager 1135, and first band response manager 1140. Each of these modules may communicate, directly or indirectly, with one another (e.g., via one or more buses).

Second band manager 1120 may receive, from a base station and while operating in a DRX mode, a wakeup message on a second band.

Data manager 1125 may identify that data is available to be transmitted on a first band to the UE based on the received wakeup message.

First band manager 1130 may transmit, based on the data being available, a signal to the base station. In some cases, the signal includes a beam recovery signal. In some cases, the first band includes a mmW frequency band and the second band includes a sub-6 GHz frequency band. In some cases, the first band includes a mmW RAT and the second band includes a sub-6 GHz RAT. In some cases, the first wakeup message includes a PDCCH message, a CSI-RS, a DMRS, a TRS, a beam reference signal, a synchronization signal, or combinations thereof. In some cases, the synchronization signal includes a PSS, a SSS, a PBCH signal, or combinations thereof. In some cases, the DRX mode includes a C-DRX mode.

Beam sweeping manager 1135 may receive a set of beam swept signals from the base station during a beam management procedure. Beam sweeping manager 1135 may identify a beam index associated with at least one of the set of beam swept signals, the beam index corresponding to a transmit beam from the base station meeting a threshold level. Beam sweeping manager 1135 may configure the signal to indicate the beam index. Beam sweeping manager 1135 may identify a beam sweeping configuration received from the base station, where the set of beam swept signals are received according to the beam sweeping configuration. In some cases, the beam sweeping configuration is identified via a signal received on the second band or pre-configured via a signal received on the first band.

First band response manager 1140 may monitor the first band to detect an additional wakeup message. First band response manager 1140 may determine that the additional wakeup message (e.g., the first wakeup message) was not received on the first band. First band response manager 1140 may monitor the second band to receive the wakeup message based on the determining, and transmit a response message to the base station using the second band, the response message indicating that the UE received the additional wakeup message using the second band but did not receive the wakeup message using the first band.

Figure 12:
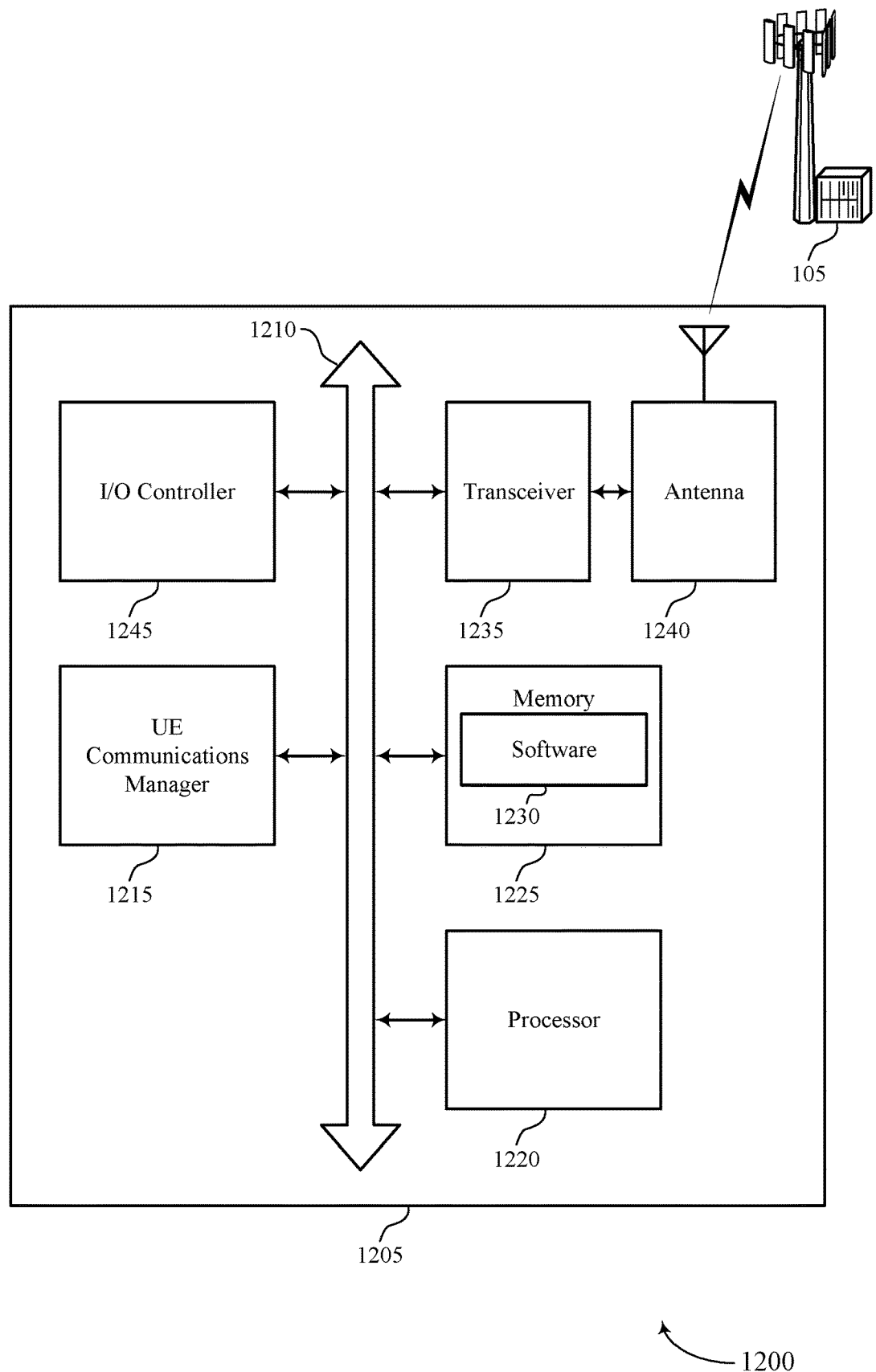
FIG. 12 illustrates a block diagram of a system including a user equipment (UE) that supports transmission of a wakeup signal through mmW and sub-6 GHz bands in accordance with aspects of the present disclosure.

FIG. 12 shows a diagram of a system 1200 including a device 1205 that supports transmission of a wakeup signal through mmW and sub-6 GHz bands in accordance with aspects of the present disclosure. Device 1205 may be an example of or include the components of UE, as described herein. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting transmission of a wakeup signal through mmW and sub-6 GHz bands).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support transmission of a wakeup signal through mmW and sub-6 GHz bands. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
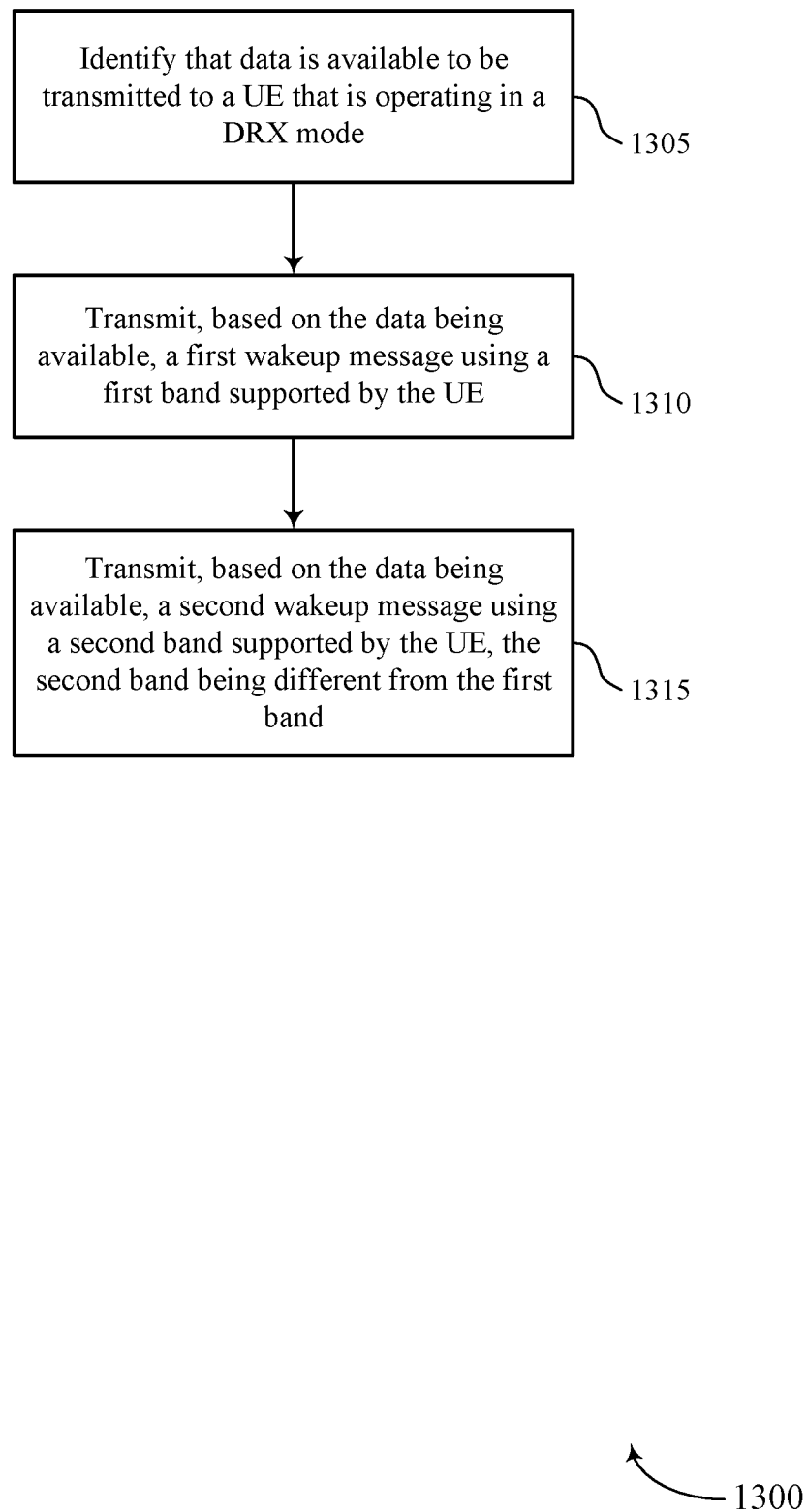
FIGS. 13 through 16 illustrate methods for transmission of a wakeup signal through mmW and sub-6 GHz bands in accordance with aspects of the present disclosure.

FIG. 13 shows a flowchart illustrating a method 1300 for transmission of a wakeup signal through mmW and sub-6 GHz bands in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify that data is available to be transmitted to a UE that is operating in a DRX mode. The operations of block 1305 may be performed according to the methods described herein. In certain examples, aspects of the operations of block 1305 may be performed by a data manager as described with reference to FIGS. 5 through 8.

At block 1310 the base station 105 may transmit, based at least in part on the data being available, a first wakeup message using a first band supported by the UE. The operations of block 1310 may be performed according to the methods described herein. In certain examples, aspects of the operations of block 1310 may be performed by a first band manager as described with reference to FIGS. 5 through 8.

At block 1315 the base station 105 may transmit, based at least in part on the data being available, a second wakeup message using a second band supported by the UE, the second band being different from the first band. The operations of block 1315 may be performed according to the methods described herein. In certain examples, aspects of the operations of block 1315 may be performed by a second band manager as described with reference to FIGS. 5 through 8.

Figure 14:
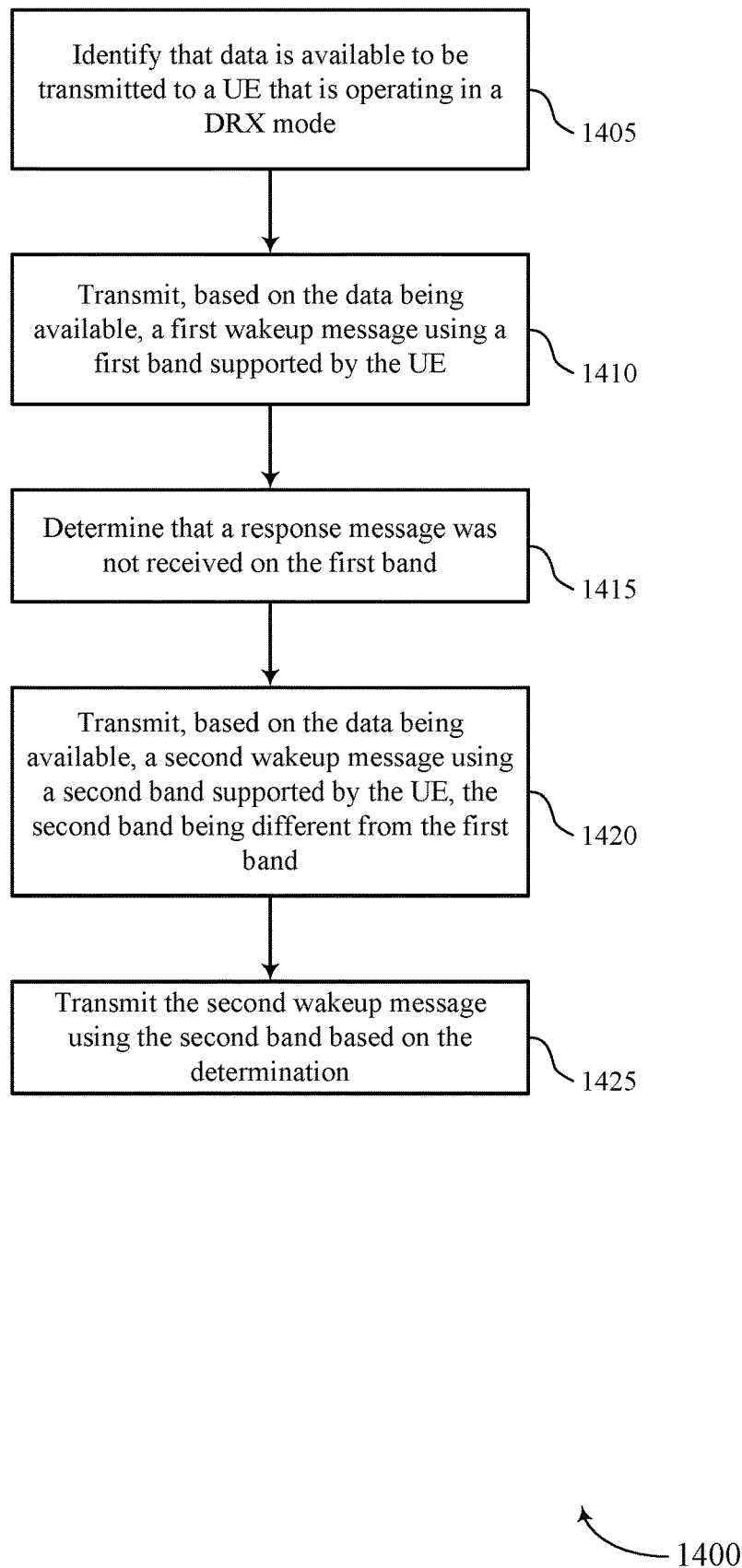

FIG. 14 shows a flowchart illustrating a method 1400 for transmission of a wakeup signal through mmW and sub-6 GHz bands in accordance with aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify that data is available to be transmitted to a UE that is operating in a DRX mode. The operations of block 1405 may be performed according to the methods described herein. In certain examples, aspects of the operations of block 1405 may be performed by a data manager as described with reference to FIGS. 5 through 8.

At block 1410 the base station 105 may transmit, based at least in part on the data being available, a first wakeup message using a first band supported by the UE. The operations of block 1410 may be performed according to the methods described herein. In certain examples, aspects of the operations of block 1410 may be performed by a first band manager as described with reference to FIGS. 5 through 8.

At block 1415 the base station 105 may determine that a response message was not received on the first band. The operations of block 1415 may be performed according to the methods described herein. In certain examples, aspects of the operations of block 1415 may be performed by a first band response manager as described with reference to FIGS. 5 through 8.

At block 1420 the base station 105 may transmit, based at least in part on the data being available, a second wakeup message using a second band supported by the UE, the second band being different from the first band. The operations of block 1420 may be performed according to the methods described herein. In certain examples, aspects of the operations of block 1420 may be performed by a second band manager as described with reference to FIGS. 5 through 8.

At block 1425 the base station 105 may transmit the second wakeup message using the second band based at least in part on the determination. The operations of block 1425 may be performed according to the methods described herein. In certain examples, aspects of the operations of block 1425 may be performed by a first band response manager as described with reference to FIGS. 5 through 8.

Figure 15:
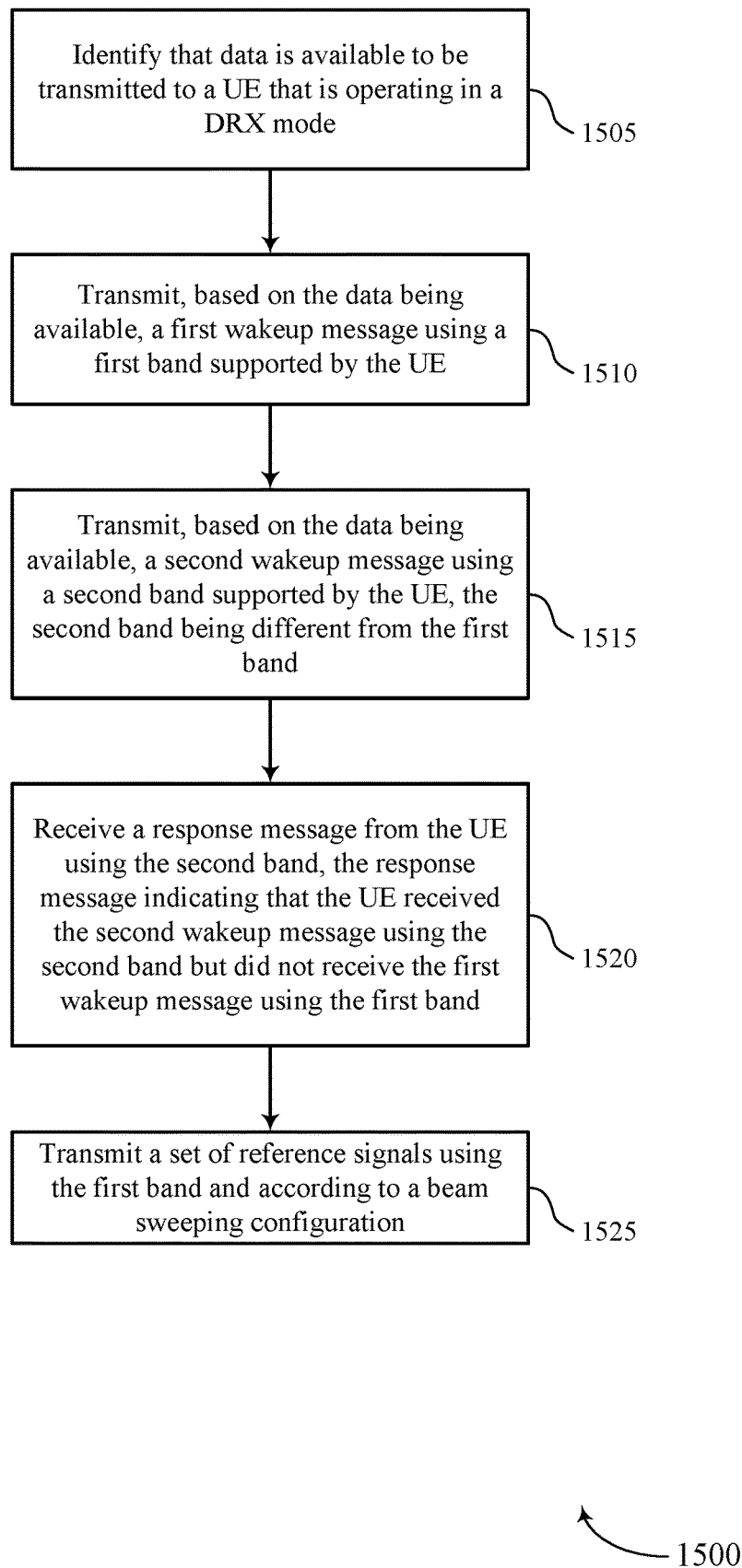

FIG. 15 shows a flowchart illustrating a method 1500 for transmission of a wakeup signal through mmW and sub-6 GHz bands in accordance with aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify that data is available to be transmitted to a UE that is operating in a DRX mode. The operations of block 1505 may be performed according to the methods described herein. In certain examples, aspects of the operations of block 1505 may be performed by a data manager as described with reference to FIGS. 5 through 8.

At block 1510 the base station 105 may transmit, based at least in part on the data being available, a first wakeup message using a first band supported by the UE. The operations of block 1510 may be performed according to the methods described herein. In certain examples, aspects of the operations of block 1510 may be performed by a first band manager as described with reference to FIGS. 5 through 8.

At block 1515 the base station 105 may transmit, based at least in part on the data being available, a second wakeup message using a second band supported by the UE, the second band being different from the first band. The operations of block 1515 may be performed according to the methods described herein. In certain examples, aspects of the operations of block 1515 may be performed by a second band manager as described with reference to FIGS. 5 through 8.

At block 1520 the base station 105 may receive a response message from the UE using the second band, the response message indicating that the UE received the second wakeup message using the second band but did not receive the first wakeup message using the first band. The operations of block 1520 may be performed according to the methods described herein. In certain examples, aspects of the operations of block 1520 may be performed by a second band response manager as described with reference to FIGS. 5 through 8.

At block 1525 the base station 105 may transmit a set of reference signals using the first band and according to a beam sweeping configuration. The operations of block 1525 may be performed according to the methods described herein. In certain examples, aspects of the operations of block 1525 may be performed by a second band response manager as described with reference to FIGS. 5 through 8.

Figure 16:
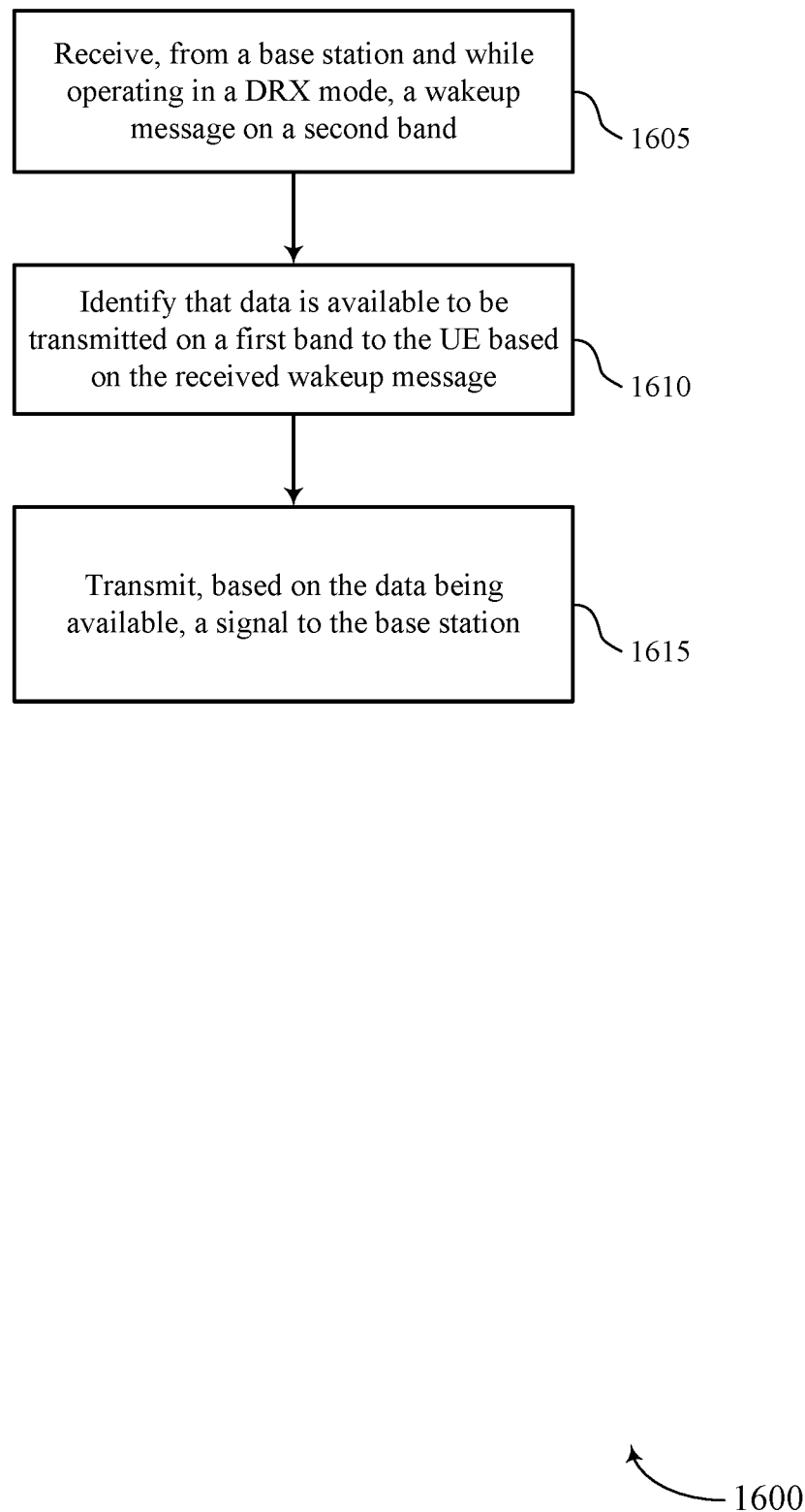

FIG. 16 shows a flowchart illustrating a method 1600 for transmission of a wakeup signal through mmW and sub-6 GHz bands in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station and while operating in a DRX mode, a wakeup message on a second band. The operations of block 1605 may be performed according to the methods described herein. In certain examples, aspects of the operations of block 1605 may be performed by a second band manager as described with reference to FIGS. 9 through 12.

At block 1610 the UE 115 may identify that data is available to be transmitted on a first band to the UE based on the received wakeup message. The operations of block 1610 may be performed according to the methods described herein. In certain examples, aspects of the operations of block 1610 may be performed by a data manager as described with reference to FIGS. 9 through 12.

At block 1615 the UE 115 may transmit, based at least in part on the data being available, a signal to the base station. The operations of block 1615 may be performed according to the methods described herein. In certain examples, aspects of the operations of block 1615 may be performed by a first band manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying that data is available to be transmitted to a user equipment (UE) that is operating in a discontinuous reception (DRX) mode;
transmitting, via a directional beam to the UE based at least in part on the data being available, a first wakeup message using a first band supported for reception by the UE according to a beamformed configuration;
determining whether a response to the first wakeup message is received on the first band based at least in part on transmitting the first wakeup message;
transmitting, via an omni-directional configuration to the UE based at least in part on determining that the response failed to be received, a second wakeup message using a second band supported for reception by the UE according to the omni-directional configuration, the second band associated with the second wakeup message being different from the first band associated with the first wakeup message;
receiving a response message from the UE using the second band, the response message indicating that the UE received the second wakeup message using the second band but did not receive the first wakeup message using the first band;
transmitting a set of reference signals using the first band and according to a beam sweeping configuration based at least in part on the receiving of the response message using the second band;
receiving a beam recovery signal in response to the set of reference signals, the beam recovery signal comprising a beam index associated with a transmit beam from the set of reference signals; and
transmitting the data that is available to the UE using the first band and according to the beam index received in the beam recovery signal.

2. The method of claim 1, further comprising:
receiving a signal on the first band, the signal indicating a second beam index associated with a second transmit beam.

3. The method of claim 2, further comprising:
transmitting the data that is available to the UE using the first band and according to the beam index received in the signal.

4. The method of claim 2, wherein:
the signal comprises a second beam recovery signal.

5. The method of claim 1, wherein:
the beam sweeping configuration is indicated to the UE through the second band or preconfigured through the first band.

6. The method of claim 1, wherein the set of reference signals comprises a channel state information reference signal (CSI-RS), a demodulation reference signal (DMRS), a tracking reference signal (TRS), a beam reference signal, a synchronization signal, or combinations thereof.

7. The method of claim 6, wherein the synchronization signal comprises a primary synchronization signal (PSS), a secondary synchronization signal (SSS), a physical broadcast channel (PBCH) signal, or combinations thereof.

8. The method of claim 1, further comprising:
transmitting the second wakeup message using the second band, wherein the second wakeup message indicates the first wakeup message being transmitted using the first band; and
transmitting the first wakeup message using the first band according to the second wakeup message indicating the first wakeup message being transmitted using the first band.

9. The method of claim 1, further comprising:
performing a beam sweeping procedure comprising a plurality of transmit beams being transmitted in a subset of directions, the subset of directions selected according to a previous measurement report received from the UE.

10. The method of claim 1, wherein:
the first band comprises a millimeter wave (mmW) radio access technology (RAT) and the second band comprises a sub-6 GHz RAT.

11. The method of claim 1, wherein:
the first wakeup message comprises a physical downlink control channel (PDCCH) message, a channel state information reference signal (CSI-RS), a demodulation reference signal (DMRS), a tracking reference signal (TRS), a beam reference signal, a synchronization signal, or combinations thereof.

12. The method of claim 11, wherein:
the synchronization signal comprises a primary synchronization signal (PSS), a secondary synchronization signal (SSS), a physical broadcast channel (PBCH) signal, or combinations thereof.

13. The method of claim 1, wherein:
the DRX mode comprises a connected discontinuous reception (C-DRX) mode.

14. The method of claim 1, wherein the first wakeup message comprises a physical downlink control channel (PDCCH) message with cyclic redundancy check (CRC) bits scrambled using a cell radio network temporary identifier (C-RNTI) of the UE.

15. A method for wireless communication at a user equipment (UE), comprising:
monitoring, while operating in a discontinuous reception (DRX) mode, a first band for a wakeup message;
determining that the wakeup message was not detected on the first band based at least in part on monitoring the first band;
monitoring a second band to receive the wakeup message based at least in part on the determining, wherein the second band is different from the first band;
receiving, via an omni-directional configuration and while operating in the DRX mode, the wakeup message on the second band according to the omni-directional configuration and based at least in part on monitoring the second band;
receiving a plurality of beam swept signals during a beam management procedure;
identifying a beam index associated with at least one of the plurality of beam swept signals, the beam index corresponding to a transmit beam meeting a threshold level;
configuring a signal to indicate the beam index;
identifying that data is available to be transmitted via a directional beam to the UE on the first band according to a beamformed configuration and based on the received wakeup message; and
transmitting, based at least in part on the data being available, the signal.

16. The method of claim 15, further comprising:
receiving the data using the first band.

17. The method of claim 16, wherein:
the signal comprises a beam recovery signal.

18. The method of claim 15, further comprising:
identifying a beam sweeping configuration received, wherein the plurality of beam swept signals are received according to the beam sweeping configuration.

19. The method of claim 18, wherein:
the beam sweeping configuration is indicated to the UE through the second band or pre-configured through the first band.

20. The method of claim 15, wherein the plurality of beam swept signals comprises a physical downlink control channel (PDCCH) signal, a channel state information reference signal (CSI-RS), a demodulation reference signal (DMRS), a synchronization signal, or combinations thereof.

21. The method of claim 15, wherein the wakeup message comprises a physical downlink control channel (PDCCH) message with cyclic redundancy check (CRC) bits scrambled using a cell radio network temporary identifier (C-RNTI) of the UE.

22. An apparatus for wireless communication, comprising:
a processor;
memory coupled with the processor; and
instructions stored in the memory and operable, when executed by the processor, to cause the apparatus to:
identify that data is available to be transmitted to a user equipment (UE) that is operating in a discontinuous reception (DRX) mode;
transmit, via a directional beam to the UE based at least in part on the data being available, a first wakeup message using a first band supported for reception by the UE according to a beamformed configuration;
determine whether a response to the first wakeup message is received on the first band based at least in part on transmitting the first wakeup message;
transmit, via an omni-directional configuration to the UE based at least in part on determining that the response failed to be received, a second wakeup message using a second band supported for reception by the UE according to the omni-directional configuration, the second band associated with the second wakeup message being different from the first band associated with the first wakeup message;
receive a response message from the UE using the second band, the response message indicating that the UE received the second wakeup message using the second band but did not receive the first wakeup message using the first band;
transmit a set of reference signals using the first band and according to a beam sweeping configuration based at least in part on the receiving of the response message using the second band;
receive a beam recovery signal in response to the set of reference signals, the beam recovery signal comprising a beam index associated with a transmit beam from the set of reference signals; and
transmit the data that is available to the UE using the first band and according to the beam index received in the beam recovery signal.

23. An apparatus for wireless communication, comprising:
a processor;
memory coupled with the processor; and
instructions stored in the memory and operable, when executed by the processor, to cause the apparatus to:
monitor, while operating in a discontinuous reception (DRX) mode at a user equipment (UE), a first band for a wakeup message;
determine that the wakeup message was not detected on the first band based at least in part on monitoring the first band;
monitor a second band to receive the wakeup message based at least in part on the determining, wherein the second band is different from the first band;
receive, via an omni-directional configuration while operating in the DRX mode, the wakeup message on the second band according to the omni-directional configuration and based at least in part on monitoring the second band;
receive a plurality of beam swept signals during a beam management procedure;

identify a beam index associated with at least one of the plurality of beam swept signals, the beam index corresponding to a transmit beam meeting a threshold level;

configure a signal to indicate the beam index;

identify that data is available to be transmitted via a directional beam to the UE on the first band according to a beamformed configuration and based on the received wakeup message; and transmit, based at least in part on the data being available, a signal.

24. The apparatus of claim 22 wherein the instructions are further configured to cause the apparatus to:

receive a signal on the first band, the signal indicating a second beam index associated with a second transmit beam.

25. The apparatus of claim 24 wherein the instructions are further configured to cause the apparatus to:

transmit the data that is available to the UE using the first band and according to the beam index received in the signal.

26. The apparatus of claim 24 wherein the signal comprises a second beam recovery signal.

\* \* \* \* \*